United States Patent
Morita et al.

(10) Patent No.: US 11,800,029 B1
(45) Date of Patent: Oct. 24, 2023

(54) TRANSPORT DEVICE, DOCUMENT READING DEVICE, AND IMAGE FORMING APPARATUS

(71) Applicant: FUJIFILM Business Innovation Corp., Tokyo (JP)

(72) Inventors: Miho Morita, Kanagawa (JP);
Nobuyoshi Hattori, Kanagawa (JP);
Tomonori Sato, Kanagawa (JP);
Tsuyoshi Mabara, Kanagawa (JP);
Isamu Adachi, Kanagawa (JP);
Tomomi Ishida, Kanagawa (JP)

(73) Assignee: FUJIFILM Business Innovation Corp., Tokyo (JP)

( * ) Notice: Subject to any disclaimer, the term of this patent is extended or adjusted under 35 U.S.C. 154(b) by 0 days.

(21) Appl. No.: 17/980,068

(22) Filed: Nov. 3, 2022

(30) Foreign Application Priority Data

Jun. 10, 2022 (JP) ................................ 2022-094439

(51) Int. Cl.
*H04N 1/00* (2006.01)
*H04N 1/12* (2006.01)
*H04N 1/203* (2006.01)

(52) U.S. Cl.
CPC ..... *H04N 1/00594* (2013.01); *H04N 1/00631* (2013.01); *H04N 1/2032* (2013.01); *H04N 1/121* (2013.01); *H04N 2201/0081* (2013.01)

(58) Field of Classification Search
CPC ............ G06F 16/00; G06F 8/70; G06F 9/445; G06Q 10/10; G06Q 30/0601; G06Q 50/10; G06Q 50/184; G03G 15/50

(Continued)

(56) References Cited

U.S. PATENT DOCUMENTS

| 4,091,741 A * | 5/1978 | Hartkorn | E05B 83/12 |
| | | | 410/94 |
| 4,877,131 A * | 10/1989 | Patros | F41C 33/06 |
| | | | 224/913 |

(Continued)

FOREIGN PATENT DOCUMENTS

| JP | H09-068910 A | 3/1997 |
| JP | 3298375 B2 | 7/2002 |

(Continued)

*Primary Examiner* — Negussie Worku
(74) *Attorney, Agent, or Firm* — Oliff PLC

(57) ABSTRACT

A transport device includes: a container portion that accommodates a transportable member; a receiving portion disposed above or below the container portion to at least partially overlap the container portion in a plan view, to receive the transportable member; a transport path along which the transportable member accommodated in the container portion is transported to the receiving portion; a first enlargement portion disposed at the container portion, the first enlargement portion moving in a direction opposite to a transport direction in which the transportable member is transported from the container portion to the transport path to enlarge a container area in the container portion for receiving the transportable member; and a second enlargement portion disposed at the receiving portion, the second enlargement portion moving in the opposite direction in conjunction with a movement of the first enlargement portion in the opposite direction to enlarge a container area in the receiving portion for receiving the transportable member.

20 Claims, 18 Drawing Sheets

(58) Field of Classification Search
USPC .......................................................... 358/400
See application file for complete search history.

(56) References Cited

U.S. PATENT DOCUMENTS

| | | |
|---|---|---|
| 10,500,874 B2 * | 12/2019 | Otsuka .................... B41J 2/1721 |
| 2004/0161328 A1 * | 8/2004 | Zimmermann ........ B65H 31/06 |
| | | 414/790.3 |
| 2010/0080622 A1 * | 4/2010 | Uchida .............. G03G 21/1623 |
| | | 399/117 |
| 2017/0242369 A1 * | 8/2017 | Yada .................. G03G 15/0891 |
| 2019/0227478 A1 * | 7/2019 | Kikura ...................... B41J 29/13 |
| 2021/0237447 A1 * | 8/2021 | Shimomura ......... B41J 2/16508 |

FOREIGN PATENT DOCUMENTS

| | | |
|---|---|---|
| JP | 2014-051361 A | 3/2014 |
| JP | 6103862 B2 | 3/2017 |

\* cited by examiner

FIG. 13
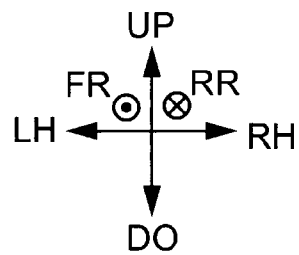
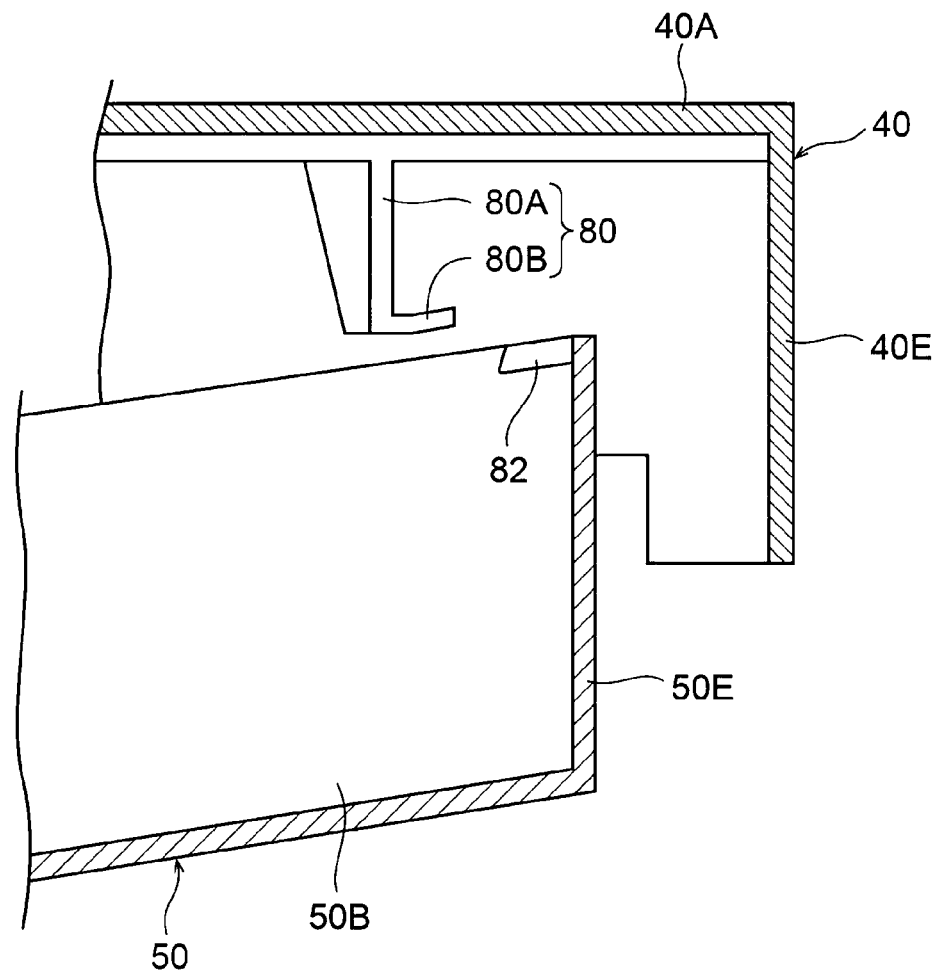

FIG. 16
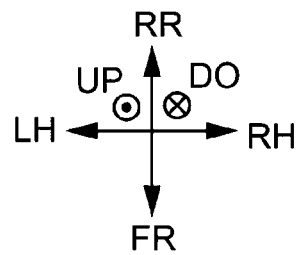
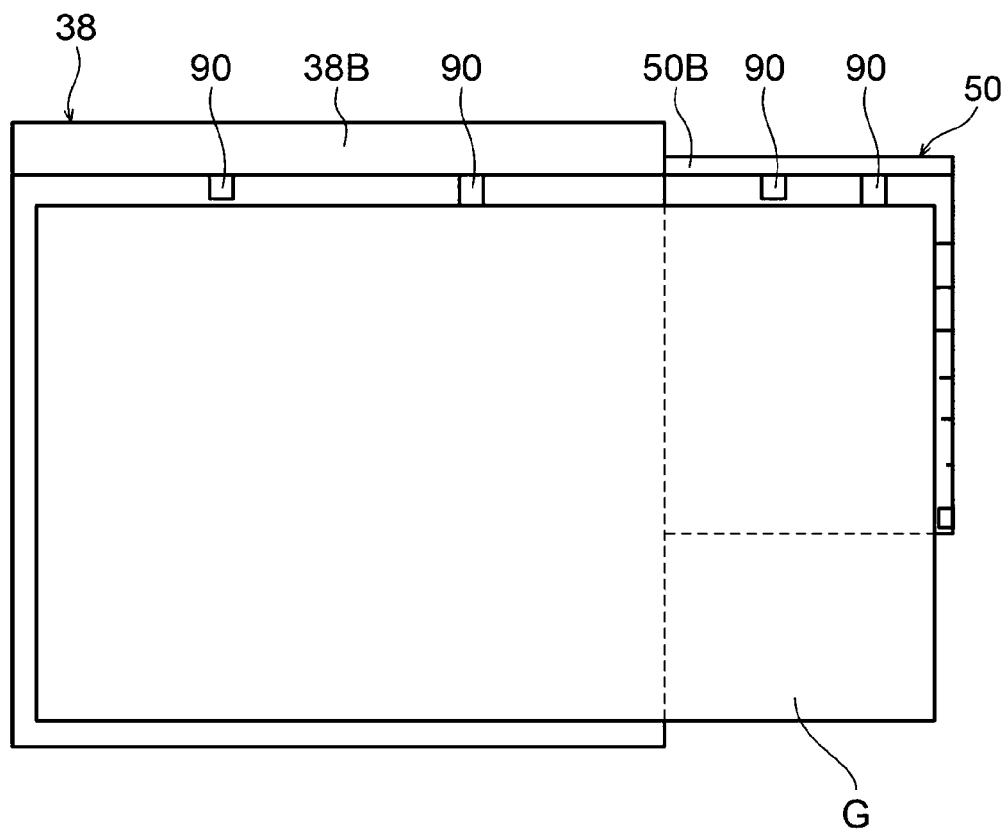

TRANSPORT DEVICE, DOCUMENT READING DEVICE, AND IMAGE FORMING APPARATUS

CROSS-REFERENCE TO RELATED APPLICATIONS

This application is based on and claims priority under 35 USC 119 from Japanese Patent Application No. 2022-094439 filed Jun. 10, 2022.

BACKGROUND

(i) Technical Field

The present disclosure relates to a transport device, a document reading device, and an image forming apparatus.

(ii) Related Art

Japanese Unexamined Patent Application Publication No. 9-68910 describes an image information processing apparatus. The image information processing apparatus includes a document reading portion that is disposed in an apparatus body to read image information, a recording portion that is disposed in the apparatus body below the document reading portion to record image information obtained from the document reading portion or an external portion, a document receiving tray having a structure openable and closeable by rotating about a predetermined position, when opened to the outside, the document receiving tray receiving a document to be read by the document reading portion along its receiving surface and, when closed, the document receiving tray being placed along the outer surface of the apparatus body, a recording-sheet receiving tray similarly having a structure openable and closeable by rotating about a predetermined position, when opened to the outside, the recording-sheet receiving tray receiving a recording sheet that has undergone recording at the recording portion along its receiving surface and, when closed, the recording-sheet receiving tray being placed to cover the closed document receiving tray, and a document receiving tray specific-rotation-direction urging member that provides the document receiving tray with a habit in the rotation direction of opening and that rotates the document receiving tray in conjunction with a shift of the recording-sheet receiving tray from the closed state to the open state.

Japanese Unexamined Patent Application Publication No. 2014-51361 describes an imaging apparatus that includes a housing accommodating an imaging unit, a lid capable of opening or closing the housing and supporting, when being opened, a sheet used at the imaging unit, an extension accommodated in the lid to support the sheet, and an interlocking mechanism that rotates the extension in conjunction with opening or closing of the lid. The interlocking mechanism rotates the extension in response to opening of the lid to pull the extension out from the lid, and rotates the extension in response to closing of the lid to retract the extension back into the lid.

Conceivable examples of a transport device include a transport device that includes a container portion that accommodates a transportable member, a receiving portion disposed above or below the container portion to at least partially overlap the container portion in a plan view to receive the transportable member, a transport path along which the transportable member accommodated in the container portion is transported to the receiving portion, a first enlargement portion disposed at the container portion to move in a direction opposite to a direction in which the transportable member is transported from the container portion to the transport path to enlarge a container area in the container portion for receiving the transportable member, and a second enlargement portion disposed at the receiving portion to move in the opposite direction to enlarge a container area in the receiving portion for receiving the transportable member.

When the second enlargement portion in the transport device moves independently from the first enlargement portion, the second enlargement portion may be left unmoved. More specifically, the transport device may discharge the transportable member to the receiving portion without the second enlargement portion being moved in the opposite direction.

SUMMARY

Aspects of non-limiting embodiments of the present disclosure relate to a transport device that moves the second enlargement portion without fail unlike in a structure where the second enlargement portion moves independently from the first enlargement portion.

Aspects of certain non-limiting embodiments of the present disclosure overcome the above disadvantages and/or other disadvantages not described above. However, aspects of the non-limiting embodiments are not required to overcome the disadvantages described above, and aspects of the non-limiting embodiments of the present disclosure may not overcome any of the disadvantages described above.

According to an aspect of the present disclosure, there is provided a transport device that includes a container portion that accommodates a transportable member, a receiving portion disposed above or below the container portion to at least partially overlap the container portion in a plan view to receive the transportable member, a transport path along which the transportable member accommodated in the container portion is transported to the receiving portion, a first enlargement portion disposed at the container portion to move in a direction opposite to a direction in which the transportable member is transported from the container portion to the transport path to enlarge a container area in the container portion for receiving the transportable member, and a second enlargement portion disposed at the receiving portion to move in the opposite direction in conjunction with the movement of the first enlargement portion in the opposite direction to enlarge a container area in the receiving portion for receiving the transportable member.

BRIEF DESCRIPTION OF THE DRAWINGS

Exemplary embodiments of the present disclosure will be described in detail based on the following figures, wherein:

FIG. 13 is a schematic diagram of a supportable portion and a support portion in the document reading device according to the present exemplary embodiment;

FIG. 16 is a plan view of the structure illustrated in FIG. 15 where the second enlargement portion is moved leftward;

DETAILED DESCRIPTION

An example of one or more exemplary embodiments of the present disclosure will be described below with reference to the drawings.

Image Forming Apparatus 10

Figure 1:
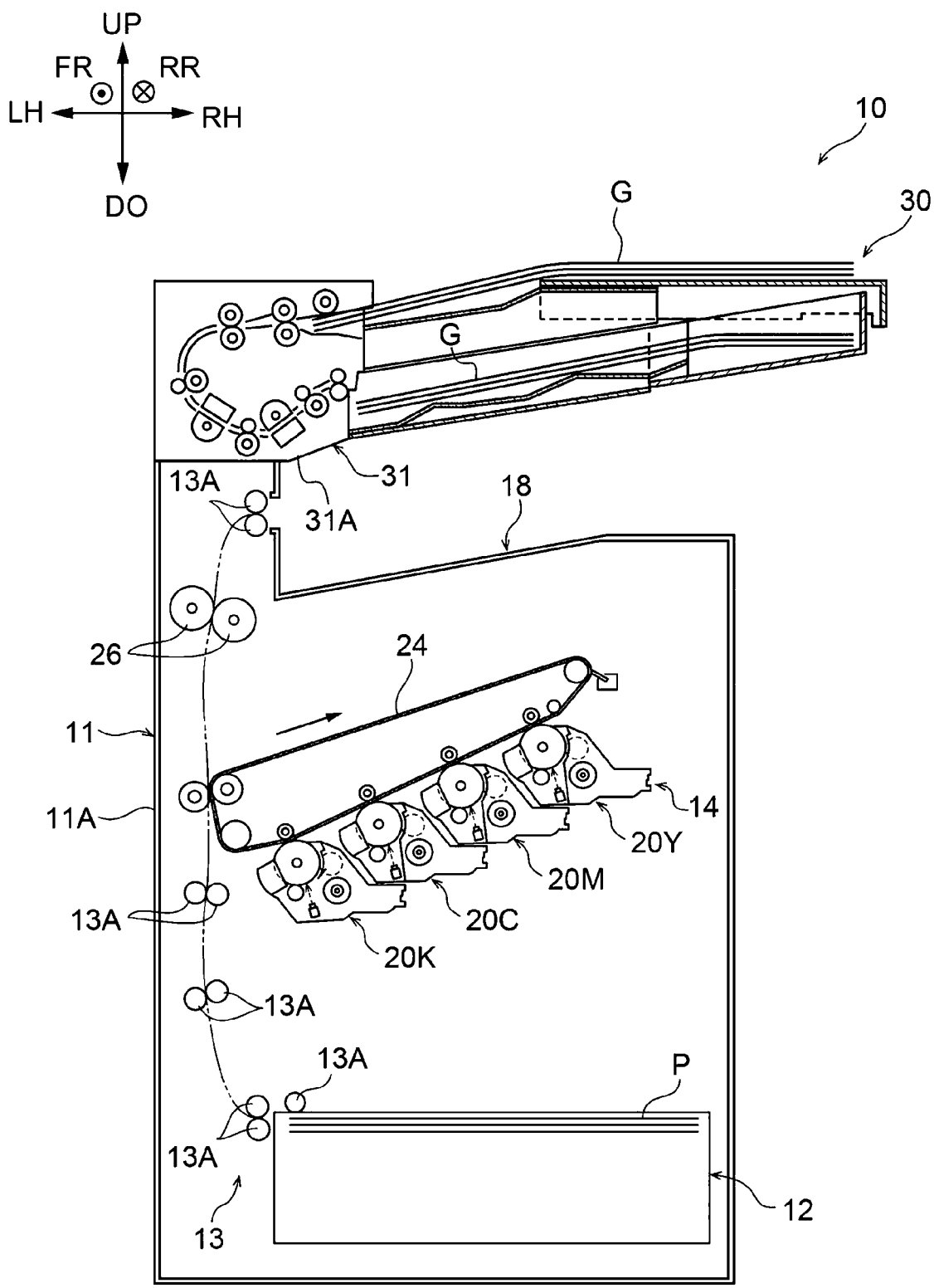
FIG. 1 is a schematic diagram of an image forming apparatus according to an exemplary embodiment.

A structure of an image forming apparatus 10 according to an exemplary embodiment will be described. FIG. 1 is a schematic diagram of a structure of the image forming apparatus 10 according to the present exemplary embodiment.

In the drawings, an arrow UP denotes the upper side of the apparatus (vertically upward), and an arrow DO denotes the lower side of the apparatus (vertically downward). In the drawings, an arrow LH denotes the left side of the apparatus, and an arrow RH denotes the right side of the apparatus. In the drawings, an arrow FR denotes the front of the apparatus, and an arrow RR denotes the rear of the apparatus. These directions are defined for convenience of illustration and do not limit the structure of the apparatus. The directions of the apparatus may be referred to without describing "of the apparatus". Specifically, for example, "the upper side of the apparatus" may be simply referred to as "the upper side".

In the following description, the "vertical direction" may be referred to as "both of the upward and downward directions" or "either one of the upward and downward directions". The "lateral direction" may be referred to as "both of the leftward and rightward directions" or "either one of the leftward and rightward directions". The "lateral direction" may be rephrased as sideward, the lateral direction, and the horizontal direction. The "front-rear direction" may also be referred to as "both of the frontward and rearward directions" or "either one of the frontward and rearward directions". The "front-rear direction" may be rephrased as sideward, the lateral direction, and the horizontal direction. The vertical direction, the lateral direction, and the front-rear direction cross each other (more specifically, they are perpendicular to each other).

In the drawings, an encircled cross sign denotes an arrow directing from the near side to the far side of the drawing. In the drawings, an encircled dot sign denotes an arrow directing from the far side to the near side of the drawing.

The image forming apparatus 10 illustrated in FIG. 1 is an apparatus that forms images. More specifically, as illustrated in FIG. 1, the image forming apparatus 10 includes an image forming apparatus body 11, a medium container portion 12, a medium receiving portion 18, a transport portion 13, an image forming portion 14, and a document reading device 30. Each portion of the image forming apparatus 10 will be described below.

Image Forming Apparatus Body 11

The image forming apparatus body 11 illustrated in FIG. 1 accommodates the image forming portion 14. More specifically, the image forming apparatus body 11 accommodates components of the image forming apparatus 10 including the image forming portion 14, and includes a housing 11A that accommodates the components of the image forming apparatus 10.

In the present exemplary embodiment, the medium container portion 12, the transport portion 13, and the image forming portion 14 are disposed inside the image forming apparatus body 11 (more specifically, the housing 11A). The medium receiving portion 18 and the document reading device 30 are disposed above the image forming apparatus body 11 (more specifically, the housing 11A).

Medium Container Portion 12

The medium container portion 12 illustrated in FIG. 1 is a portion of the image forming apparatus 10 that accommodates recording media P. The recording media P accommodated in the medium container portion 12 are transported to the image forming portion 14. The image forming portion 14 forms images on the recording media P accommodated in the medium container portion 12. Examples of the recording media P include sheets and films. Examples of films include resin films and metal films. Instead of the above examples, various other recording media may be used as the recording media P.

Medium Receiving Portion 18

The medium receiving portion 18 illustrated in FIG. 1 receives the recording media P on which images are formed by the image forming portion 14. The medium receiving portion 18 is disposed at an upper portion of the image forming apparatus body 11 (the housing 11A) and below the document reading device 30. More specifically, the medium receiving portion 18 is formed by the upper surface of the housing 11A.

Transport Portion 13

The transport portion 13 illustrated in FIG. 1 is a portion of the image forming apparatus 10 that transports the recording media P. More specifically, the transport portion 13 transports the recording media P accommodated in the medium container portion 12 to the medium receiving portion 18. In the present exemplary embodiment, as illustrated in FIG. 1, the transport portion 13 includes transport members 13A such as multiple transport rollers, and the transport members 13A transport the recording media P. For example, the transport members 13A may be transport members such as transport belts and transport drums, or various other transport members.

Image Forming Portion 14

The image forming portion 14 illustrated in FIG. 1 is a component capable of forming images read by the document reading device 30 on the recording media. More specifically, the image forming portion 14 forms toner images (examples of an image) with an electrophotographic system on the recording media P transported by the transport portion 13 (more specifically, the transport members 13A). More specifically, as illustrated in FIG. 1, the image forming portion 14 includes toner-image forming portions 20Y, 20M, 20C, and 20K (referred to as toner-image forming portions 20Y to 20K below), a transfer body 24, and a fixing portion 26.

The toner-image forming portions 20Y to 20K in the image forming portion 14 perform charging, exposure, development, and transfer operations to form respective toner images of yellow (Y), magenta (M), cyan (C), and black (K) on the transfer body 24. The image forming portion 14 also transfers the toner images of the respective colors formed on the transfer body 24 to the recording media P, and fixes the toner images onto the recording media P with the fixing portion 26. Thus, the image forming portion 14 employs an intermediate transfer method for transferring the images to the recording media P with the transfer body 24.

The example of the image forming portion is not limited to the image forming portion 14 described above. The image forming portion may employ, for example, a direct transfer method with which the toner-image forming portions 20Y to 20K directly form toner images on the recording media P without using the transfer body 24. The image forming portion may be any portion having a function of forming images on the recording media P, for example, an image forming portion that forms images by ejecting inks onto the recording media P.

Document Reading Device 30

Figure 2:
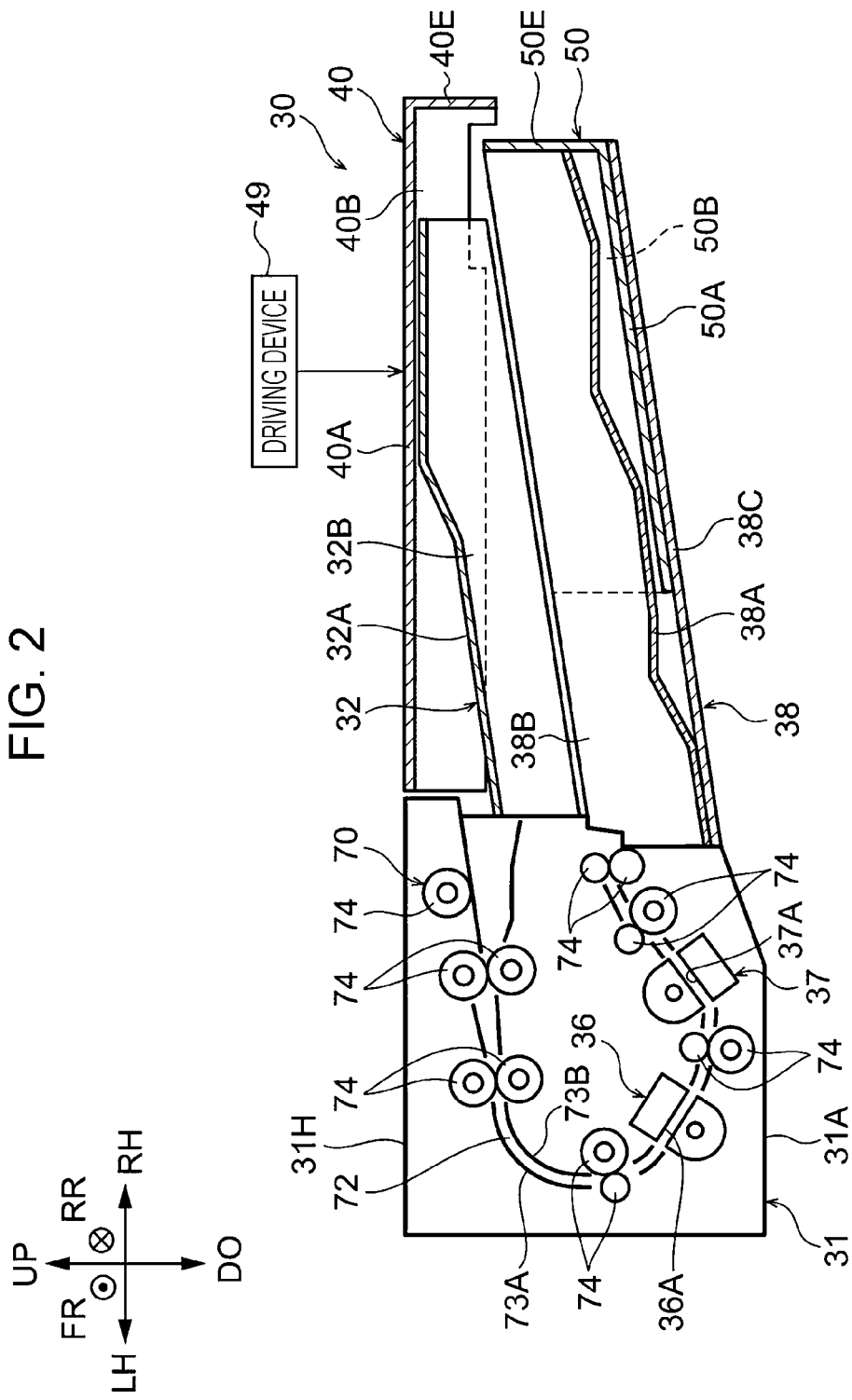
FIG. 2 is a schematic diagram of a document reading device according to the present exemplary embodiment.
Figure 3:
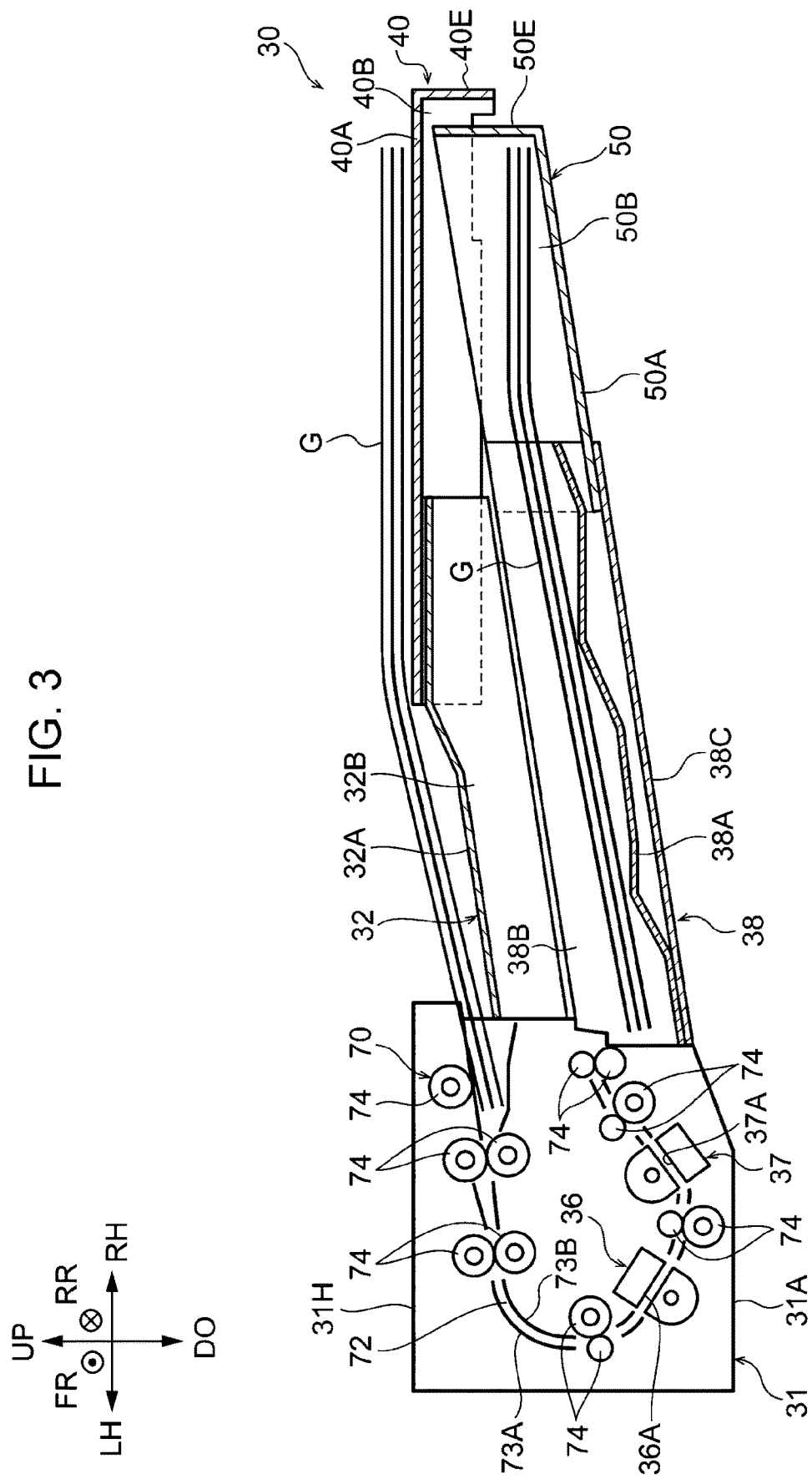
FIG. 3 is a schematic diagram of a structure illustrated in FIG. 2 where a first enlargement portion and a second enlargement portion are extended.

The document reading device 30 illustrated in FIG. 1 is an example of a transport device, and a device that reads images on documents G. More specifically, as illustrated in FIG. 2 and FIG. 3, the document reading device 30 includes a document reading device body 31, a document container portion 32, a document receiving portion 38, a transport mechanism 70, reading portions 36 and 37, a first enlargement portion 40, a second enlargement portion 50, an interlocking mechanism 60 (refer to FIG. 10), a support portion 80 (refer to FIG. 13), and a supportable portion 82 (refer to FIG. 13). The components of the document reading device 30 will be described below.

Document Reading Device Body 31

The document reading device body 31 illustrated in FIG. 2 and FIG. 3 is a portion accommodating the components of the document reading device 30, and includes a housing 31A that accommodates the components of the document reading device 30.

As illustrated in FIG. 1, the document reading device body 31 is fixed to the image forming apparatus body 11 at an upper portion of the image forming apparatus body 11. More specifically, the document reading device body 31 has a lower end portion fixed to an upper end portion of the image forming apparatus body 11 on the left side of the medium receiving portion 18. More specifically, the document reading device body 31 does not move, for example, rotate relative to the image forming apparatus body 11.

In the present exemplary embodiment, as illustrated in FIG. 2 and FIG. 3, the transport mechanism 70 and the reading portions 36 and 37 are disposed inside the document reading device body 31 (specifically, the housing 31A). As illustrated in FIG. 2 and FIG. 3, the document container portion 32 and the document receiving portion 38 are disposed on the right side of the document reading device body 31 (specifically, the housing 31A).

Document Container Portion 32

The document container portion 32 illustrated in FIG. 2 and FIG. 3 is a portion of the document reading device 30 that accommodates the documents G. As illustrated in FIG. 2 and FIG. 3, the document container portion 32 is disposed at the document reading device body 31 to extend obliquely upward to the right from the document reading device body 31.

More specifically, the document container portion 32 includes a mount wall 32A that receives the documents G, and a pair of side walls 32B disposed at the front and rear of the mount wall 32A. The document container portion 32 accommodates the documents G when the mount wall 32A receives the documents G. The documents G accommodated in the document container portion 32 are transported to the reading portions 36 and 37.

FIG. 2 and FIG. 3 illustrate the rear one of the paired side walls 32B, and omit illustration of the front one of the side walls 32B.

The documents G accommodated in the document container portion 32 are examples of a transportable member, and each have an image thereon to be read by the reading portions 36 and 37. Examples of the documents G include sheets and films. Examples of the films include resin films and metal films. Instead of the above examples, various other documents may be used as the documents G.

Document Receiving Portion 38

The document receiving portion 38 illustrated in FIG. 2 and FIG. 3 is a portion of the document reading device 30 that receives the documents G. More specifically, the document receiving portion 38 receives the documents G transported by the transport mechanism 70 and each having the image read by the reading portions 36 and 37.

As illustrated in FIG. 2 and FIG. 3, the document receiving portion 38 is disposed below the document container portion 32 to at least partially overlap the document container portion 32 in a plan view. More specifically, the document receiving portion 38 is disposed at the document reading device body 31 to extend obliquely upward to the right from the document reading device body 31.

In the exemplary embodiment, the document receiving portion 38 includes a mount wall 38A that receives the documents G, and a pair of side walls 38B disposed at the front and rear of the mount wall 38A. The document receiving portion 38 accommodates the documents G when the mount wall 32A receives the documents G discharged from the document reading device body 31. Ribs 32S extending in the lateral direction are formed on the upper surface of the mount wall 32A (refer to FIG. 9).

The plan view is a view viewed downward from the top. FIG. 2 and FIG. 3 illustrate the rear one of the paired side walls 38B, and omit illustration of the front one of the side walls 38B.

Figure 4:
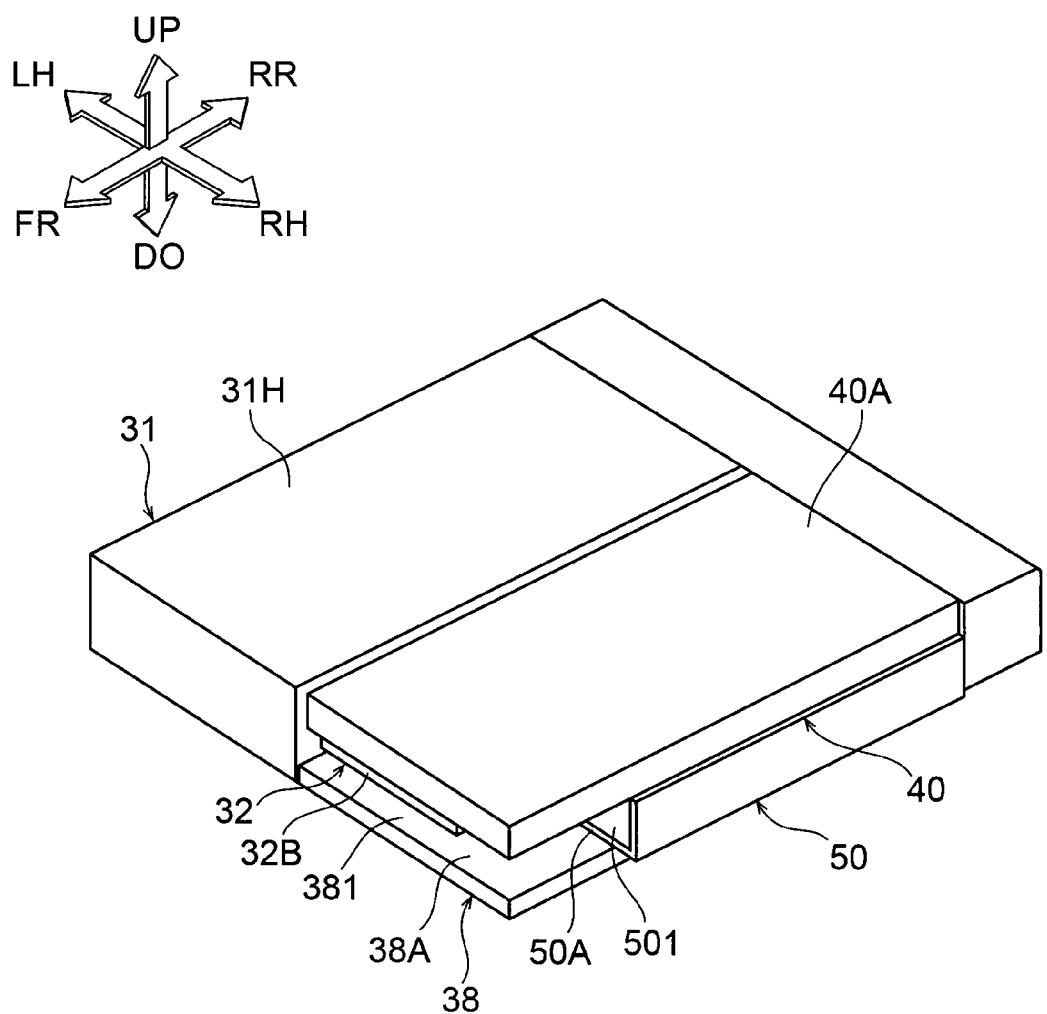
FIG. 4 is a schematic, perspective view of the document reading device according to the present exemplary embodiment.
Figure 5:
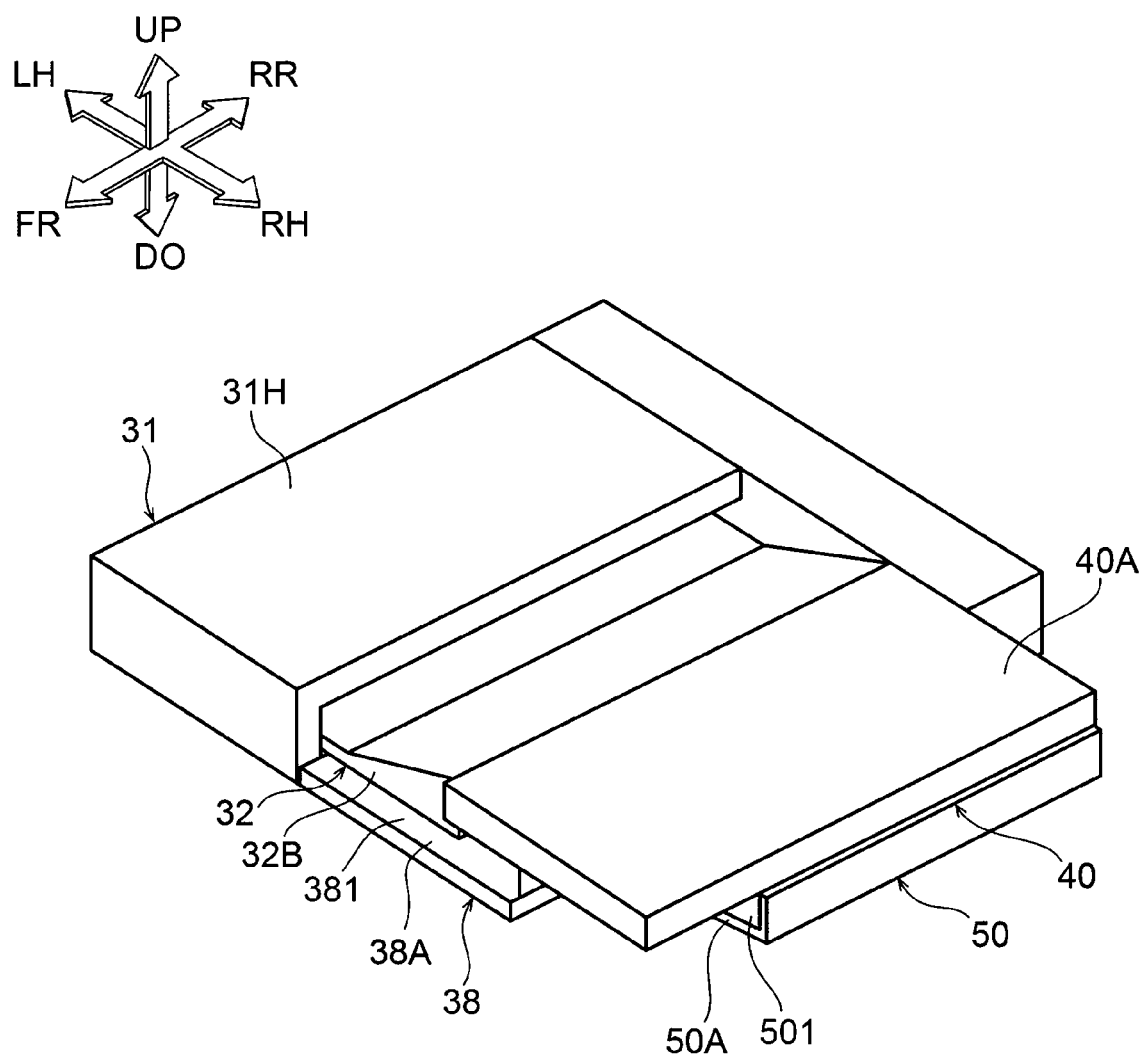
FIG. 5 is a schematic diagram of a structure illustrated in FIG. 4 where the first enlargement portion and the second enlargement portion are extended.

The rear side wall 38B extends to the upper side of the mount wall 38A. The front side wall 38B is disposed to the lower side from the mount wall 38A without extending to the upper side of the mount wall 38A. Thus, a space 381 between the document receiving portion 38 (specifically, the mount wall 38A) and the document container portion 32 (specifically, the front side wall 32B) is open at the device front side, as illustrated in FIG. 4 and FIG. 5. FIG. 4 and FIG. 5 schematically illustrate the components in the document reading device 30.

As illustrated in FIG. 2 and FIG. 3, the document receiving portion 38 also includes a bottom wall 38C disposed below the mount wall 38A, and a guide wall 38D (refer to FIG. 6) disposed at the rear of the rear side wall 38B.

Figure 6:
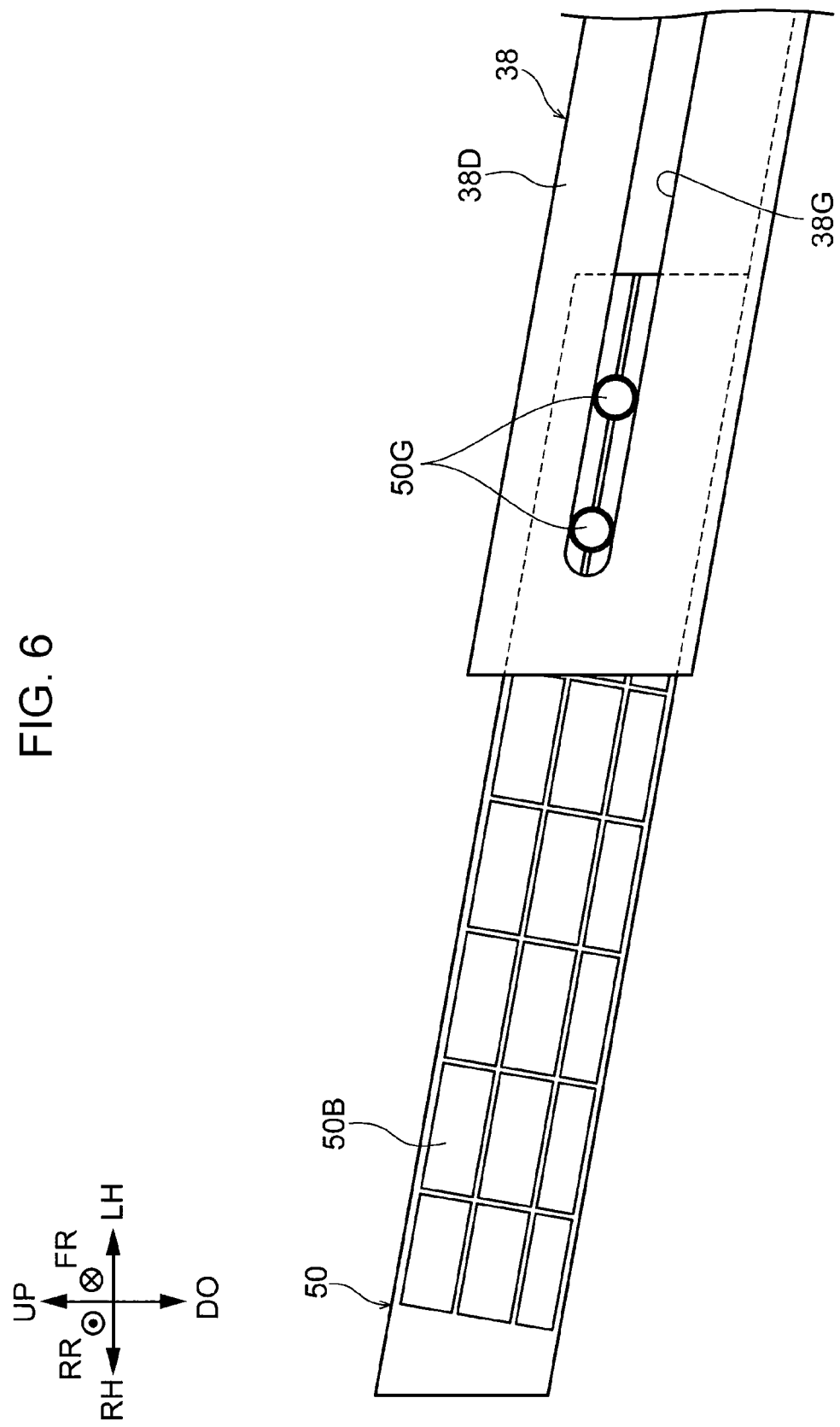
FIG. 6 is a rear view of the second enlargement portion and a document receiving portion in the document reading device according to the present exemplary embodiment.

The guide wall 38D illustrated in FIG. 6 is a component that guides in the second enlargement portion 50. As illustrated in FIG. 6, the guide wall 38D has a long hole 38G that receives a pair of protrusions 50G in the second enlargement portion 50. The pair of protrusions 50G will be described later. The long hole 38G extends in the lateral direction (specifically, obliquely upward to the right from the obliquely left lower portion). The long hole 38G functions as a rail that guides in the second enlargement portion 50 with the pair of protrusions 50G.

Figure 7:
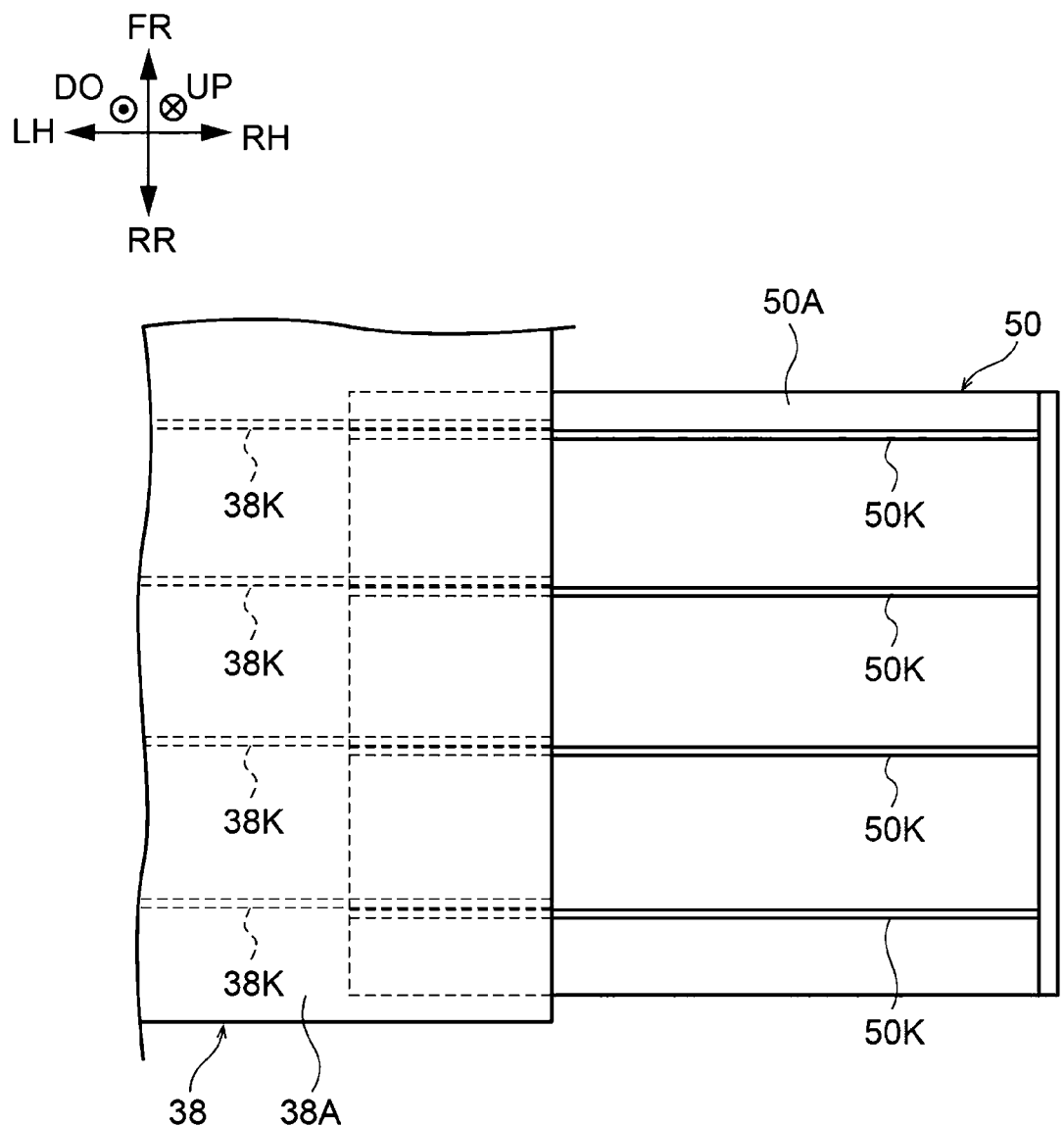
FIG. 7 is a bottom view of the second enlargement portion and the document receiving portion in the document reading device according to the present exemplary embodiment.
Figure 8:
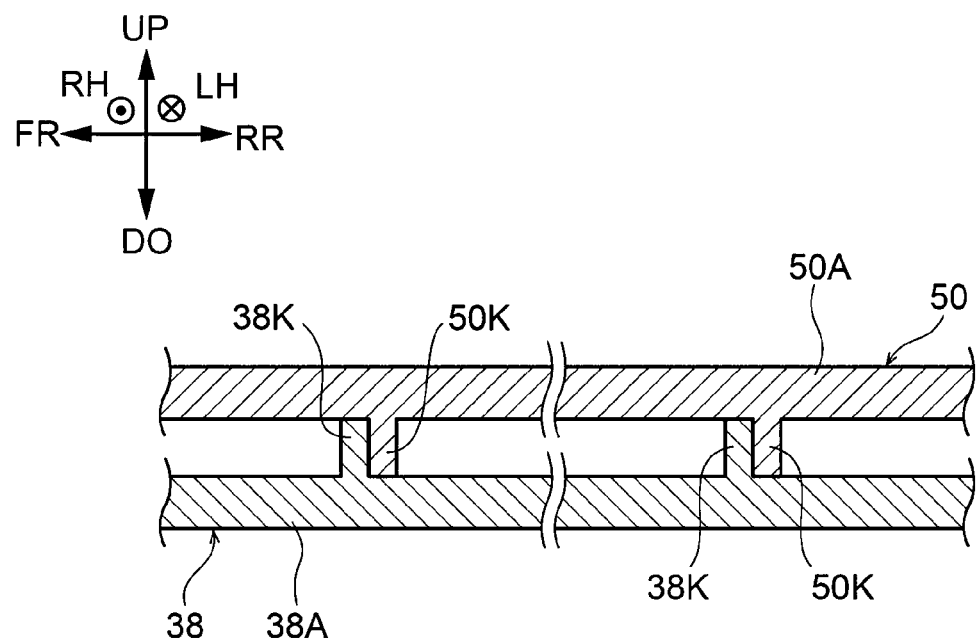
FIG. 8 is a cross-sectional view, viewed from a side, of the second enlargement portion and the document receiving portion in the document reading device according to the present exemplary embodiment.

As illustrated in FIG. 7 and FIG. 8, on the upper surface of the bottom wall 38C, ribs 38K are disposed to restrict movement of the second enlargement portion 50 in the device front-rear direction. The ribs 38K are examples of a restrictor, and extend in the lateral direction. The ribs 38K are arranged side by side in the front-rear direction. Each of the multiple ribs 38K is disposed adjacent to a corresponding one of multiple ribs 50K, described later, in the second enlargement portion 50, for example, at the front of the rib 50K.

Transport Mechanism 70

The transport mechanism 70 illustrated in FIG. 2 and FIG. 3 is a mechanism in the document reading device 30 that transports the documents G. Specifically, as illustrated in FIG. 2 and FIG. 3, the transport mechanism 70 is disposed at the document reading device body 31, and includes a document transport path 72, and multiple transport members 74.

The document transport path 72 is an example of a transport path along which the documents G accommodated in the document container portion 32 are transported to the document receiving portion 38. As illustrated in FIG. 2 and FIG. 3, when viewed in the front-rear direction, the document transport path 72 has a letter C shape from the document container portion 32 toward the document receiving portion 38. The view in the front-rear direction is a view from either the front or rear to the other.

As illustrated in FIG. 2 and FIG. 3, the document transport path 72 is disposed at the document reading device body 31, and specifically defined by transport path surfaces 73A and 73B opposing each other.

Specifically, the transport members 74 are formed from transport rollers, and transport the documents G accommodated in the document container portion 32 along the document transport path 72 to the document receiving portion 38. The transport members 74 may be, for example, transport members such as transport belts and transport drums, or various other transport members.

Reading Portions 36 and 37

The reading portions 36 and 37 illustrated in FIG. 2 and FIG. 3 are components that read images on the documents G transported along the document transport path 72.

As illustrated in FIG. 2 and FIG. 3, the reading portion 36 is disposed in the middle of the document transport path 72 at an inner circumference of the C-shaped document transport path 72. The reading portion 36 has a reading surface 36A that reads images. The reading surface 36A faces one surface of each of the documents G transported along the document transport path 72, and the reading portion 36 reads the image on the surface of the document G transported along the document transport path 72 with the reading surface 36A. The reading surface 36A also functions as a guide surface (that is, transport path surface) that guides the documents G.

As illustrated in FIG. 2 and FIG. 3, the reading portion 37 is disposed at a portion of the document transport path 72 downstream from the reading portion 36 in the transport direction and on the outer circumference of the C-shaped document transport path 72. The reading portion 37 has a reading surface 37A that reads images. The reading surface 37A faces the other surface of each of the documents G transported along the document transport path 72. The reading portion 37 reads the image on the other surface of the document G transported along the document transport path 72 with the reading surface 37A. The reading surface 37A also functions as a guide surface (that is, a transport path surface) that guides the documents G.

As examples of the reading portions 36 and 37, image sensors used in close contact with an object to be scanned and called contact image sensors (CISs) are used. Instead of the image sensors used in close contact with an object to be scanned, other image sensors may be used as the reading portions 36 and 37 as long as the sensors are capable of reading images on the documents G.

First Enlargement Portion 40

The first enlargement portion 40 illustrated in FIG. 2 and FIG. 3 is disposed at the document container portion 32 to enlarge the container area in the document container portion 32 for receiving the documents G.

Specifically, as illustrated in FIG. 2 and FIG. 3, the first enlargement portion 40 includes a mount wall 40A that receives the documents G, a pair of side walls 40B disposed at the front and rear of the mount wall 40A, and a right wall 40E disposed at the right of the mount wall 40A. The pair of side walls 40B and the right wall 40E extend downward from the mount wall 40A.

The first enlargement portion 40 including the mount wall 40A, the pair of side walls 40B, and the right wall 40E has a box shape with the left side and the lower side open. FIG. 2 and FIG. 3 illustrate the rear one of the paired side walls 40B, and omit illustration of the front one of the side walls 40B.

The first enlargement portion 40 moves in the direction opposite to the transport direction of the documents G from the document container portion 32 to the document transport path 72 (specifically, moves rightward) to enlarge the container area in the document container portion 32 for receiving the documents G.

More specifically, the first enlargement portion 40 is attached to the document container portion 32 to be movable between a covering position (the position illustrated in FIG.

2 and FIG. 4) where the first enlargement portion 40 covers the document container portion 32 (specifically, the mount wall 32A) and an open position (the position illustrated in FIG. 3 and FIG. 5) where the first enlargement portion 40 exposes the upper side of the document container portion 32 (specifically, the mount wall 32A).

As illustrated in FIG. 2, in the state where the first enlargement portion 40 is in the covering position, the mount wall 40A is disposed adjacent to an upper surface 31H of the document reading device body 31 to be aligned with the upper surface 31H. More specifically, the upper surface of the mount wall 40A is disposed to be flush with the upper surface 31H of the document reading device body 31. In the state where the first enlargement portion 40 is in the covering position, the mount wall 32A in the document container portion 32 is covered, and thus the document container portion 32 fails to accommodate the documents G.

As illustrated in FIG. 3, in the state where the first enlargement portion 40 is in the open position, both the mount wall 32A in the document container portion 32 and the mount wall 40A in the first enlargement portion 40 are capable of receiving the documents G. In the first enlargement portion 40, the mount wall 40A receives trailing end portions (that is, upstream end portions in the transport direction) of the documents G received on the mount wall 32A in the document container portion 32.

Thus, the first enlargement portion 40 moves rightward from the covering position to the open position to enlarge the container area in the document container portion 32 for receiving the documents G.

In the present exemplary embodiment, the first enlargement portion 40 has the same height (vertical position) in the covering position and the open position. More specifically, the first enlargement portion 40 moves horizontally between the covering position and the open position.

In the present exemplary embodiment, the first enlargement portion 40 is moved in the lateral direction by a driving device 49 (refer to FIG. 2). The driving device 49 may be, for example, a driving device including mechanical components such as a cylinder or a belt. The first enlargement portion 40 may be manually moved by a user in the lateral direction.

Second Enlargement Portion 50

The second enlargement portion 50 illustrated in FIG. 2 and FIG. 3 is disposed at the document receiving portion 38 to enlarge the container area in the document receiving portion 38 for receiving the documents G.

More specifically, the second enlargement portion 50 includes a mount wall 50A that receives the documents G, a side wall 50B disposed at the rear of the mount wall 50A, and a right wall 50E disposed at the right side of the mount wall 50A. The side wall 50B and the right wall 50E extend upward from the mount wall 50A.

The second enlargement portion 50 moves rightward in conjunction with rightward movement of the first enlargement portion 40 to enlarge the container area in the document receiving portion 38 for receiving the documents G. In the present exemplary embodiment, the second enlargement portion 50 moves obliquely upward to the right toward the first enlargement portion 40 in conjunction with the rightward movement of the first enlargement portion 40.

More specifically, the second enlargement portion 50 is attached to the document receiving portion 38 while being movable between a retraction position (the position illustrated in FIG. 2 and FIG. 4) where the second enlargement portion 50 is retracted into the document receiving portion 38, and a pull-out position (the position illustrated in FIG. 3 and FIG. 5) where the second enlargement portion 50 is pulled out from the document receiving portion 38.

As illustrated in FIG. 2, in the state where the second enlargement portion 50 is in the retraction position, the mount wall 50A is retracted between the mount wall 38A and the bottom wall 38C in the document receiving portion 38.

As illustrated in FIG. 3, in the state where the second enlargement portion 50 is in the pull-out position, both the mount wall 38A in the document receiving portion 38 and the mount wall 50A in the second enlargement portion 50 are capable of receiving the documents G discharged from the document reading device body 31. In the second enlargement portion 50, the mount wall 50A receives the leading end portions (that is, downstream end portions in the transport direction) of the documents G received by the mount wall 38A in the document receiving portion 38.

Thus, the second enlargement portion 50 moves rightward from the retraction position to the pull-out position to enlarge the container area in the document receiving portion 38 for receiving the documents G.

In the present exemplary embodiment, the height (vertical position) of the second enlargement portion 50 is higher in the pull-out position than in the retraction position. More specifically, the second enlargement portion 50 moves obliquely upward to the right to rise from the retraction position to the pull-out position. Thus, the second enlargement portion 50 moves obliquely upward to the right toward, in the vertical direction, the first enlargement portion 40 moving horizontally.

As illustrated in FIG. 6, in the present exemplary embodiment, the pair of protrusions 50G that protrude rearward are disposed at the side wall 50B in the second enlargement portion 50. The pair of protrusions 50G are inserted into the long hole 38G in the document receiving portion 38. When the pair of protrusions 50G are guided by the long hole 38G, the second enlargement portion 50 moves in the lateral direction between the retraction position and the pull-out position.

In the second enlargement portion 50, the side wall 50B is not disposed at the front of the mount wall 50A. As illustrated in FIG. 4 and FIG. 5, a space 501 between the second enlargement portion 50 (more specifically, the mount wall 50A) and the first enlargement portion 40 is open at the device front side.

As illustrated in FIG. 7 and FIG. 8, ribs 50K extend in the lateral direction on the bottom surface of the mount wall 50A in the second enlargement portion 50. The ribs 50K are arranged side by side in the front-rear direction. Each of the multiple ribs 50K is adjacent to a corresponding one of ribs 38K in the document receiving portion 38 at the rear of the rib 38K.

In the present exemplary embodiment, when the ribs 38K come into with the ribs 50K, the ribs 38K restrict a movement, in the device front-rear direction, of the second enlargement portion 50 that moves rightward in conjunction with the rightward movement of the first enlargement portion 40.

Figure 9:
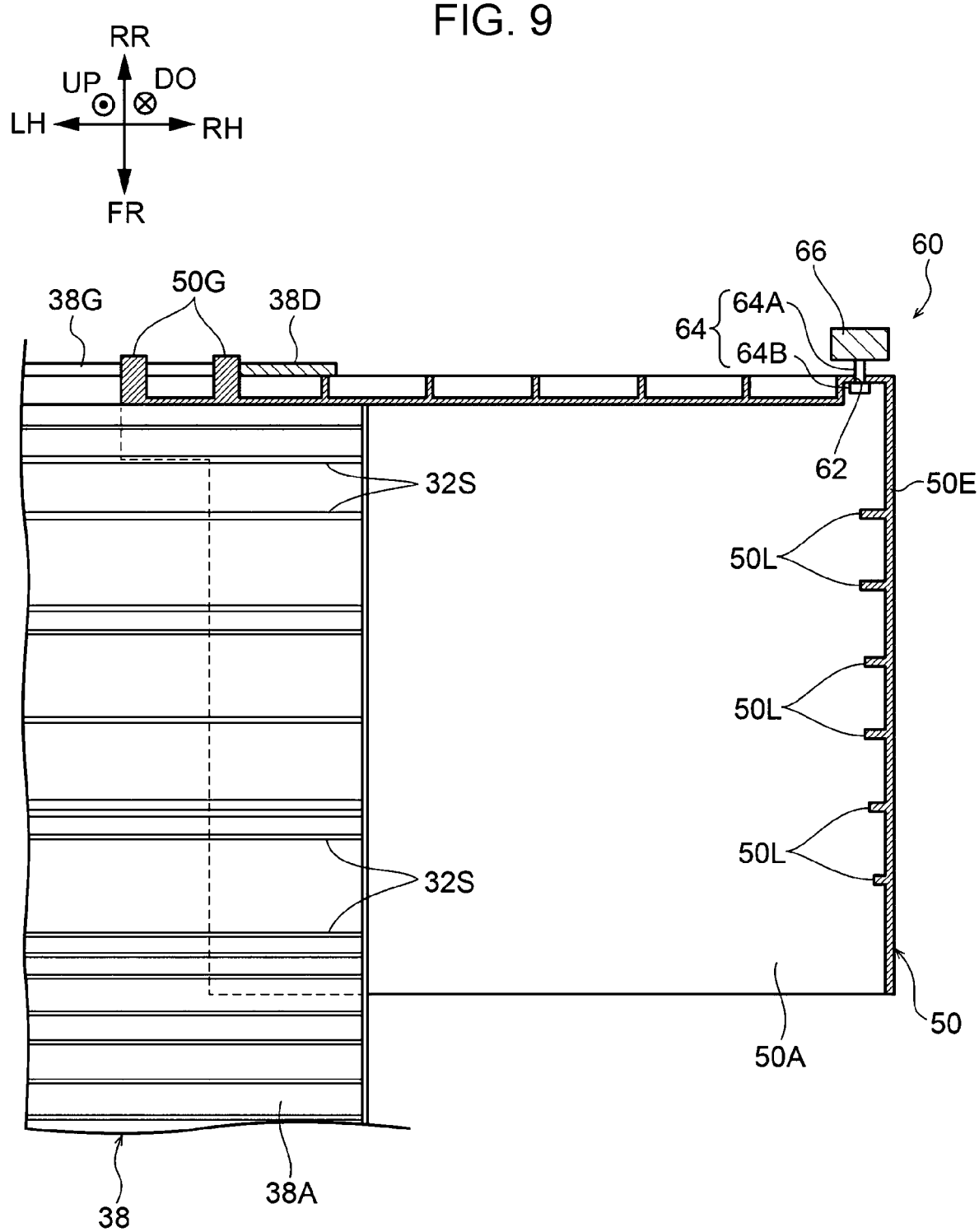
FIG. 9 is a cross-sectional view, viewed from the above, of the second enlargement portion and the document receiving portion in the document reading device according to the exemplary embodiment.

As illustrated in FIG. 9, ribs 50L are disposed at the right wall 50E in the second enlargement portion 50 to extend in the lateral direction (or simply "to the right"). More specifically, the ribs 50L are disposed at the corner between the left surface of the right wall 50E and the upper surface of the mount wall 50A. The ribs 50L are arranged side by side in the front-rear direction.

Among the multiple ribs 50L, a subset of the ribs 50L disposed closer to the device front side has a smaller dimension in the lateral direction than a subset of the ribs 50L disposed closer to the apparatus rear side. More specifically, the ribs 50L disposed closer to the front have gradually smaller dimensions in the lateral direction.

The ribs 50L are examples of a protrusion, the right wall 50E is an example of an end in the movement direction, and the rightward direction is an example of the movement direction.

Interlocking Mechanism 60

Figure 10:
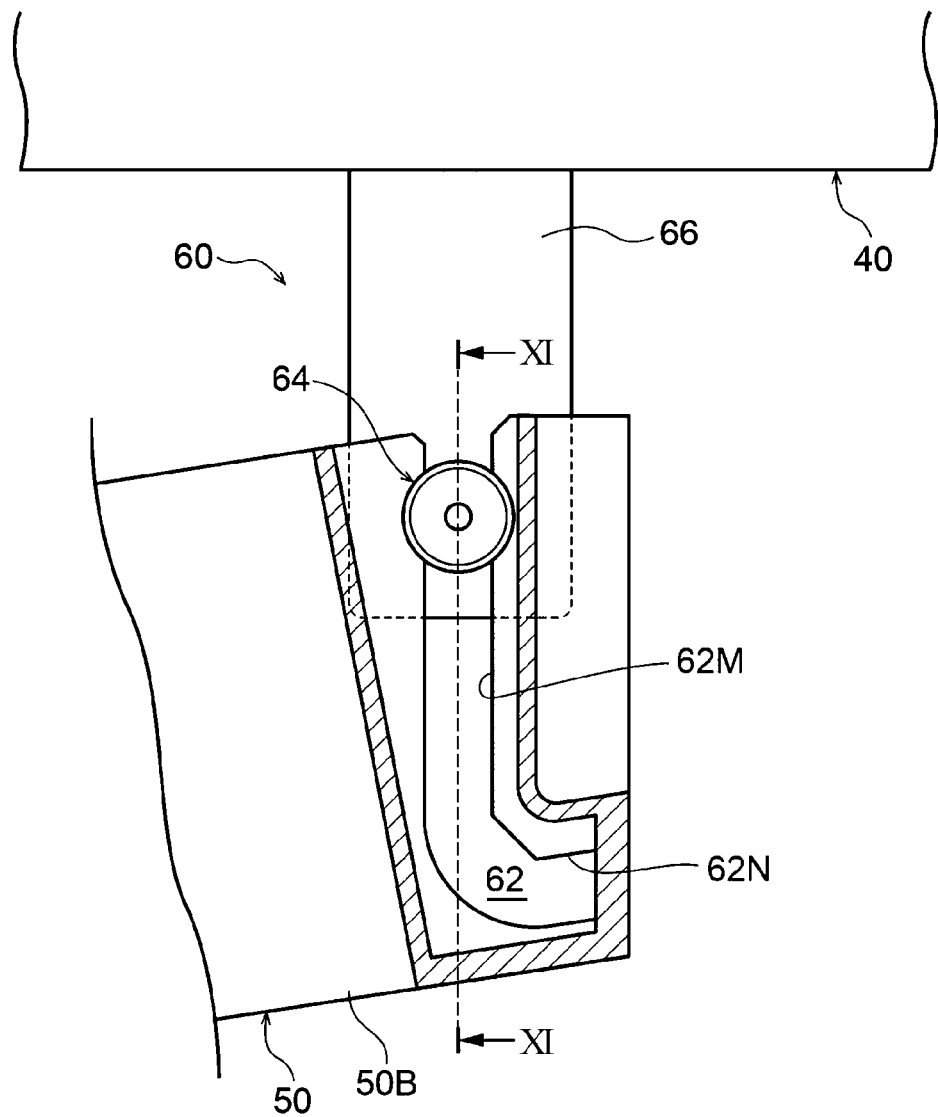
FIG. 10 is a schematic diagram of an interlocking mechanism in the document reading device according to the present exemplary embodiment.
Figure 11:
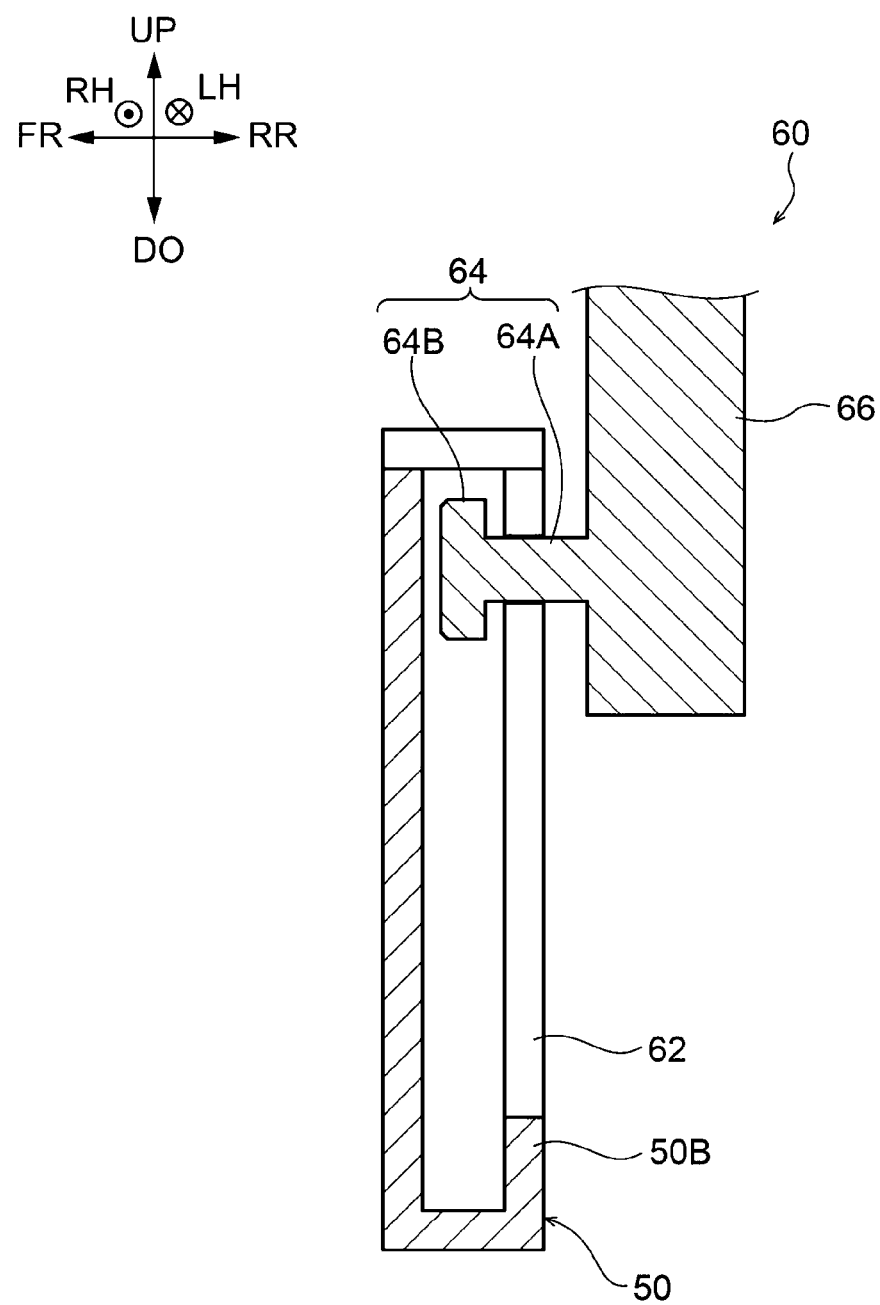
FIG. 11 is a cross-sectional view of the interlocking mechanism in the document reading device according to the present exemplary embodiment taken along line XIA-XIA in FIG. 10.

The interlocking mechanism 60 illustrated in FIG. 9, FIG. 10, FIG. 11, and FIG. 12 is a mechanism that moves the second enlargement portion 50 rightward in conjunction with the rightward movement of the first enlargement portion 40. More specifically, as illustrated in FIG. 10 and FIG. 11, the interlocking mechanism 60 includes a long hole 62, a coupling shaft 64, and an attachment portion 66.

The attachment portion 66 is disposed at the first enlargement portion 40, and has the coupling shaft 64 attached thereto. More specifically, at the rear of the second enlargement portion 50, the attachment portion 66 extends downward from a rear portion of the first enlargement portion 40.

The coupling shaft 64 is an example of a coupling portion, and is coupled to the long hole 62. The coupling shaft 64 is attached to the attachment portion 66 to protrude frontward from the attachment portion 66. More specifically, the coupling shaft 64 includes a shaft portion 64A and a flange 64B. The shaft portion 64A protrudes frontward from the attachment portion 66, is received in the long hole 62, and has a cylindrical shape. The flange 64B is disposed at the front end of the shaft portion 64A to project radially outward of the shaft portion 64A. The flange 64B functions as a safety lock to prevent the shaft portion 64A from being removed rearward from the long hole 62.

The long hole 62 is an example of a to-be-coupled portion, and a component with which the coupling shaft 64 is coupled. The long hole 62 is formed in the side wall 50B in the second enlargement portion 50.

Figure 12:
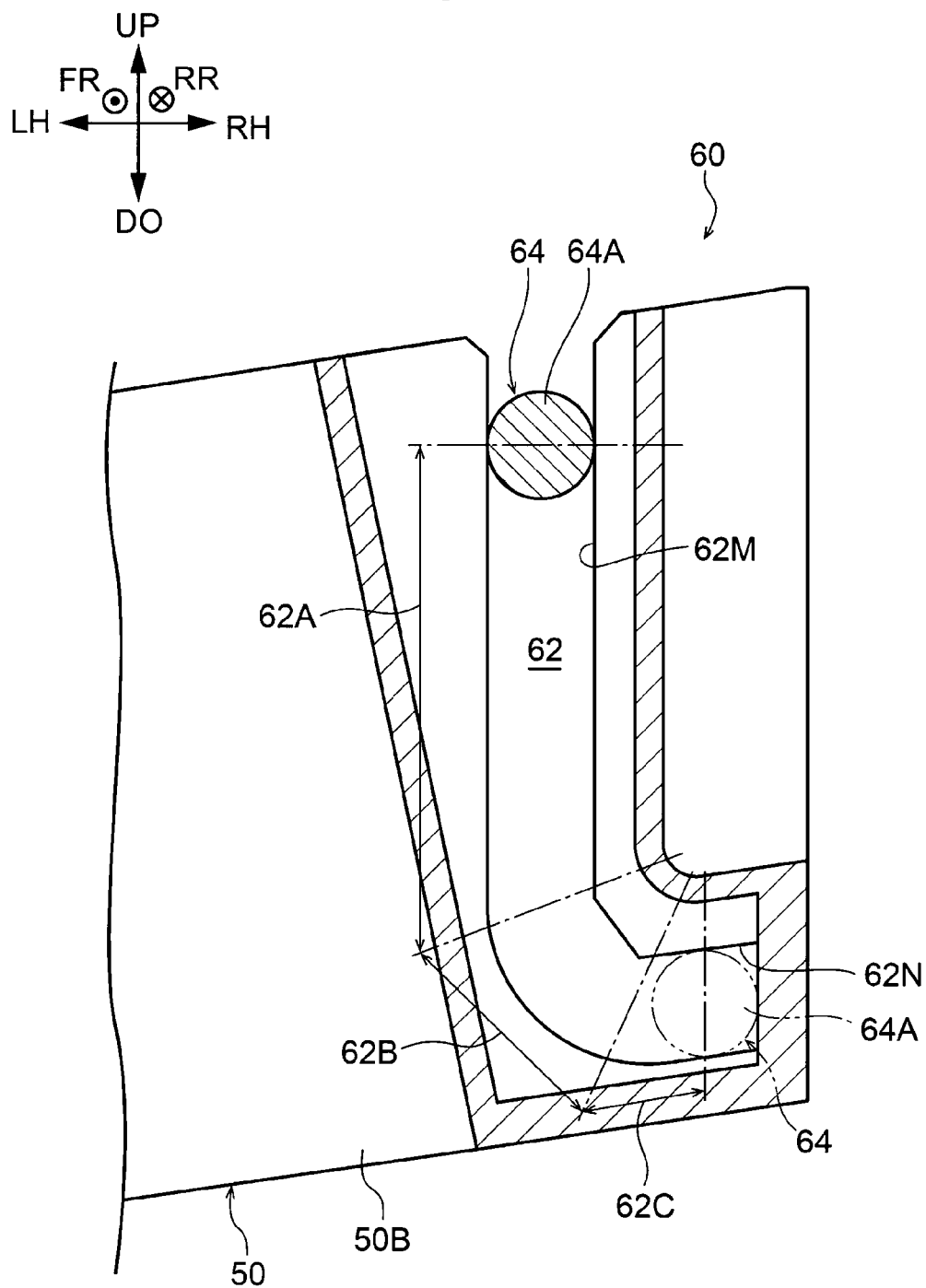
FIG. 12 is a schematic diagram of sections in a long hole in the interlocking mechanism in the document reading device according to the present exemplary embodiment.

More specifically, as illustrated in FIG. 12, the long hole 62 includes a first section 62A that extends in the vertical direction, a second section 62B that is bent rightward into an arc shape from the lower end of the first section 62A, and a third section 62C that extends rightward from the right end of the second section 62B.

In the present exemplary embodiment, when the first enlargement portion 40 moves rightward, the coupling shaft 64 pushes a right edge 62M of the long hole 62 rightward in the first section 62A in the long hole 62. Thus, the second enlargement portion 50 moves rightward in conjunction with the rightward movement of the first enlargement portion 40.

At this time, the coupling shaft 64 moves downward relative to the long hole 62 along the long hole 62 in the first section 62A in the long hole 62. In other words, in conjunction with the rightward movement of the first enlargement portion 40, the long hole 62 guides the coupling shaft 64 in the direction in which the second enlargement portion 50 comes closer to the first enlargement portion 40. Thus, during a period when the coupling shaft 64 moves in the first section 62A in the long hole 62, the second enlargement portion 50 moves rightward at the same speed as the first enlargement portion 40 while moving upward toward the first enlargement portion 40. Thus, the second enlargement portion 50 moves obliquely upward to the right toward the first enlargement portion 40 in conjunction with the rightward movement of the first enlargement portion 40.

When the first enlargement portion 40 moves rightward, the coupling shaft 64 moves along the arc along the long hole 62 in the second section 62B in the long hole 62. Thus, in a period where the coupling shaft 64 moves in the second section 62B in the long hole 62, the second enlargement portion 50 moves rightward at the speed lower than the first enlargement portion 40 while moving upward toward the first enlargement portion 40. The second enlargement portion 50 thus moves toward the first enlargement portion 40 also in the lateral direction while moving toward the enlargement portion 40 in the vertical direction.

When the first enlargement portion 40 moves further rightward, the coupling shaft 64 moves rightward along the long hole 62 in the third section 62C in the long hole 62. Thus, in the third section 62C in the long hole 62, the second enlargement portion 50 is in a stationary state without the coupling shaft 64 pushing the second enlargement portion 50 rightward.

In other words, the long hole 62 allows the first enlargement portion 40 to move further rightward while the second enlargement portion 50 is in a stationary state in the third section 62C after moving rightward in conjunction with the rightward movement of the first enlargement portion 40.

The coupling shaft 64 comes into contact with an upper edge 62N of the long hole 62 in the third section 62C in the long hole 62, and the second enlargement portion 50 is supported by the coupling shaft 64.

In other words, while the second enlargement portion 50 is in the stationary state after moving rightward in conjunction with the rightward movement of the first enlargement portion 40, the long hole 62 allows the coupling shaft 64 to move relative to the long hole 62 to a support position where the coupling shaft 64 supports the second enlargement portion 50 as a result of the first enlargement portion 40 moving further rightward.

Support Portion 80 and Supportable Portion 82

Figure 14:
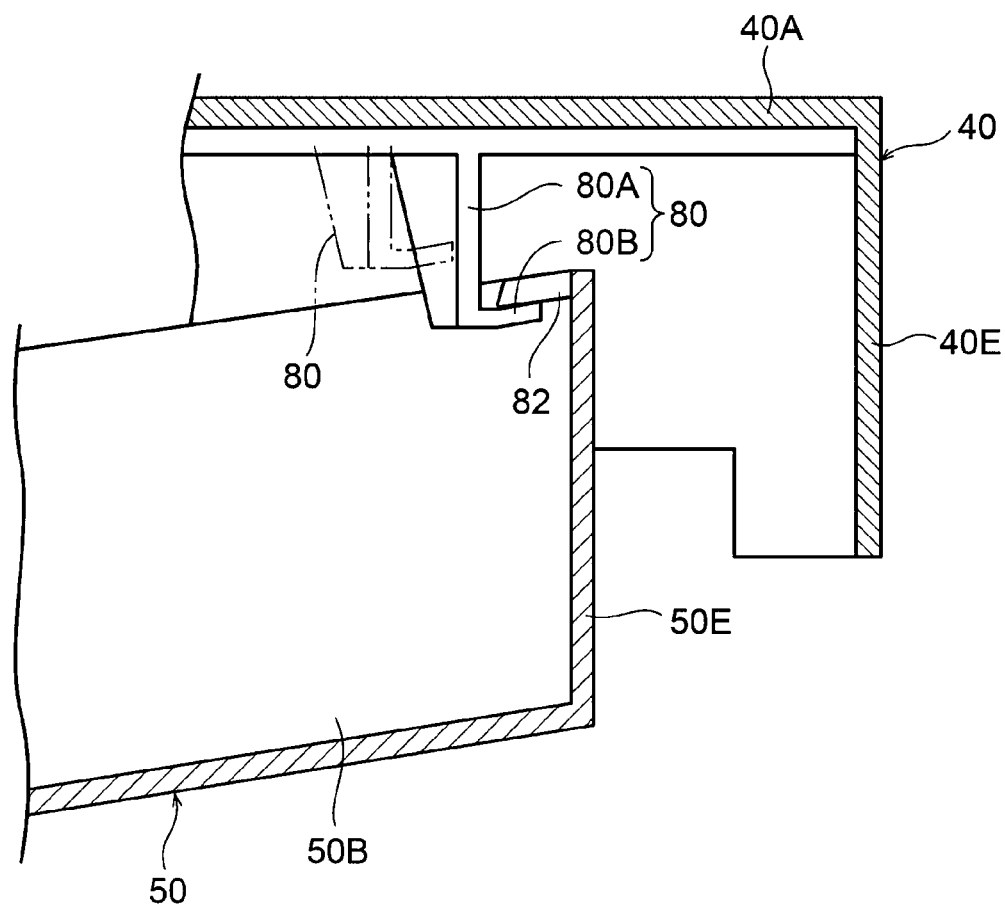
FIG. 14 is a schematic diagram of the structure illustrated in FIG. 13 where the support portion supports the supportable portion.

The support portion 80 illustrated in FIG. 13 and FIG. 14 is a component that supports the device front side of the second enlargement portion 50 after the second enlargement portion 50 moves obliquely upward toward the first enlargement portion 40.

As illustrated in FIG. 13 and FIG. 14, the support portion 80 is disposed at the first enlargement portion 40. More specifically, the support portion 80 includes a portion 80A extending downward from the bottom surface of the mount wall 40A in the first enlargement portion 40 on the front side, and a protruding portion 80B that protrudes rightward from the lower end of the portion 80A.

The supportable portion 82 is supported by the support portion 80, and disposed at the second enlargement portion 50. More specifically, the supportable portion 82 protrudes leftward from an upper portion of the right wall 50E in the second enlargement portion 50 on the front side.

In a period where the coupling shaft 64 moves in the first section 62A in the long hole 62, the support portion 80 vertically moves toward the supportable portion 82 without changing the positional relationship between itself and the supportable portion 82 in the lateral direction. Specifically, in this period, the support portion 80 moves downward relative to the supportable portion 82. In this period, although moving toward the supportable portion 82, the support portion 80 is located above the supportable portion 82.

In a period where the coupling shaft 64 moves in the second section 62B in the long hole 62, the support portion 80 moves downward relative to the supportable portion 82 while moving toward the supportable portion 82 in the lateral direction. After the period where the coupling shaft 64 moves in the second section 62B in the long hole 62 is finished, the protruding portion 80B in the support portion 80 is located below the supportable portion 82.

In a period where the coupling shaft 64 moves in the third section 62C in the long hole 62, the first enlargement portion 40 moves rightward while the second enlargement portion 50 is in a stationary state. Thus, the protruding portion 80B in the support portion 80 moves to below the supportable portion 82. Thus, as illustrated in FIG. 14, the support portion 80 supports the supportable portion 82.

Operation of Present Exemplary Embodiment

In the present exemplary embodiment, the second enlargement portion 50 moves rightward in conjunction with the rightward movement of the first enlargement portion 40 to enlarge the container area in the document receiving portion 38 for receiving the documents G. Thus, unlike in the case where the second enlargement portion 50 moves independently from the first enlargement portion 40, the present exemplary embodiment prevents the second enlargement portion 50 from being left unmoved. Specifically, unlike in the case where the second enlargement portion 50 moves independently from the first enlargement portion 40, the present exemplary embodiment prevents the documents G from being discharged to the document receiving portion 38 in the state where the second enlargement portion 50 is not moved rightward.

Thus, the present exemplary embodiment prevents the second enlargement portion 50 from being left unmoved. Thus, unlike in the case where the second enlargement portion 50 moves independently from the first enlargement portion 40, the present exemplary embodiment prevents the documents G from falling down from the document receiving portion 38.

In addition, the present exemplary embodiment prevents the second enlargement portion 50 from being left unmoved, and thus enables reduction of the container area in the document receiving portion 38 alone. Thus, the present exemplary embodiment enables size reduction of the entire device when the document receiving portion 38 is not used unlike in the case where the second enlargement portion 50 moves independently from the first enlargement portion 40.

In the present exemplary embodiment, as illustrated in FIG. 2 and FIG. 3, the document receiving portion 38 is disposed below the document container portion 32 to at least partially overlap the document container portion 32 in a plan view. Thus, when the documents G are placed in the document container portion 32 from above, the present exemplary embodiment facilitates placement of the documents G without being interrupted by the document receiving portion 38, unlike in the case where the document receiving portion 38 is disposed over the document container portion 32 to at least partially overlap the document container portion 32 in a plan view.

In the present exemplary embodiment, the second enlargement portion 50 moves obliquely upward to the right toward the first enlargement portion 40 in conjunction with the rightward movement of the first enlargement portion 40. The second enlargement portion 50 thus moves toward the first enlargement portion 40. Unlike in the case where the second enlargement portion 50 moves horizontally and parallel to the first enlargement portion 40, a space is secured above and below the first enlargement portion 40 and the second enlargement portion 50. As a result of the second enlargement portion 50 moving obliquely upward to the right, the second enlargement portion 50 obliquely rises toward the downstream side in the transport direction of transporting the documents G. Thus, unlike in the case where the second enlargement portion 50 moves horizontally and parallel to the first enlargement portion 40, the documents G discharged to the document receiving portion 38 and the second enlargement portion 50 are easily aligned.

In the present exemplary embodiment, the long hole 62 guides the coupling shaft 64 in a direction in which the second enlargement portion 50 moves toward the first enlargement portion 40 in conjunction with the rightward movement of the first enlargement portion 40. Thus, unlike in the case where the long hole 62 has only a function of being coupled with the coupling shaft 64, the second enlargement portion 50 smoothly moves toward the first enlargement portion 40.

In the present exemplary embodiment, the long hole 62 allows the first enlargement portion 40 to move further rightward while the second enlargement portion 50 is in the stationary state in the third section 62C after moving rightward in conjunction with the rightward movement of the first enlargement portion 40.

Thus, compared to the case where the long hole 62 restricts the rightward movement of the first enlargement portion 40 while the second enlargement portion 50 is in the stationary state after moving rightward in conjunction with the rightward movement of the first enlargement portion 40, the present exemplary embodiment enables further enlargement of the container area in the document container portion 32 for receiving the documents G.

In the present exemplary embodiment, while the second enlargement portion 50 is in the stationary state after moving rightward in conjunction with the rightward movement of the first enlargement portion 40, the long hole 62 allows the coupling shaft 64 to move relative to the long hole 62 to the support position where the coupling shaft 64 supports the second enlargement portion 50 as a result of the first enlargement portion 40 being moved further rightward.

The present embodiment prevents the second enlargement portion 50 from hanging down compared to the case where the coupling shaft 64 is moved relative to the long hole 62 to an unsupported position where the second enlargement portion 50 is not supported as a result of the first enlargement portion 40 being moved further rightward while the second enlargement portion 50 is in the stationary state after moving rightward in conjunction with the rightward movement of the first enlargement portion 40.

In the present exemplary embodiment, as illustrated in FIG. 4 and FIG. 5, the space 501 between the second enlargement portion 50 (specifically, the mount wall 50A) and the first enlargement portion 40 is open at the device front side.

Compared to the case where the space 501 between the second enlargement portion 50 and the first enlargement portion 40 is closed at the device front side, the present exemplary embodiment facilitates removal of the documents G discharged to the document receiving portion 38 from the device front side.

In the present exemplary embodiment, the support portion 80 supports the device front side of the second enlargement portion 50 after the second enlargement portion 50 moves obliquely upward toward the first enlargement portion 40. Thus, the present exemplary embodiment prevents the second enlargement portion 50 from hanging down compared to the structure where the second enlargement portion 50 is supported at only the apparatus rear side after the second enlargement portion 50 moves obliquely upward toward the first enlargement portion 40.

In the present exemplary embodiment, the ribs 38K restrict a movement, in the device front-rear direction, of the second enlargement portion 50 that moves rightward in conjunction with the rightward movement of the first enlargement portion 40. Thus, compared to the case where the second enlargement portion 50 that moves rightward in conjunction with the rightward movement of the first enlargement portion 40 is freely movable in the device front-rear direction, the present exemplary embodiment prevents the second enlargement portion 50 from being inclined in the device front-rear direction with respect to the document receiving portion 38 during the rightward movement.

In the present exemplary embodiment, among the multiple ribs 50L disposed on the right wall 50E in the second enlargement portion 50, the ribs 50L disposed closer to the device front side have smaller dimensions in the lateral direction than the ribs 50L disposed closer to the apparatus rear side.

Thus, compared to the case where all the multiple ribs 50L have the same dimension in the movement direction, the present exemplary embodiment prevents deformation of the end of the receiving portion while securing the container area in the receiving portion for receiving the transportable member.

Modification Examples of Document Receiving Portion 38, First Enlargement Portion 40, and Second Enlargement Portion 50

Figure 15:
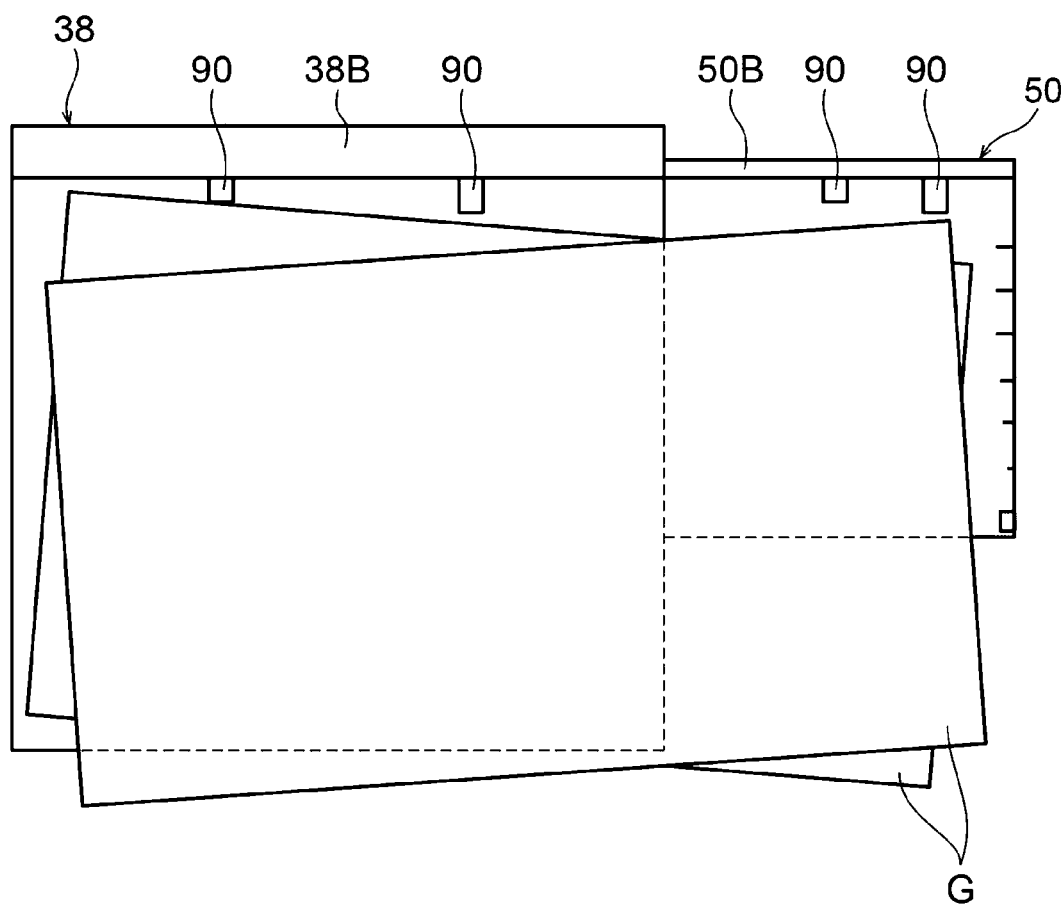
FIG. 15 is a plan view of a document receiving portion and a second enlargement portion according to a modification example.
Figure 17:
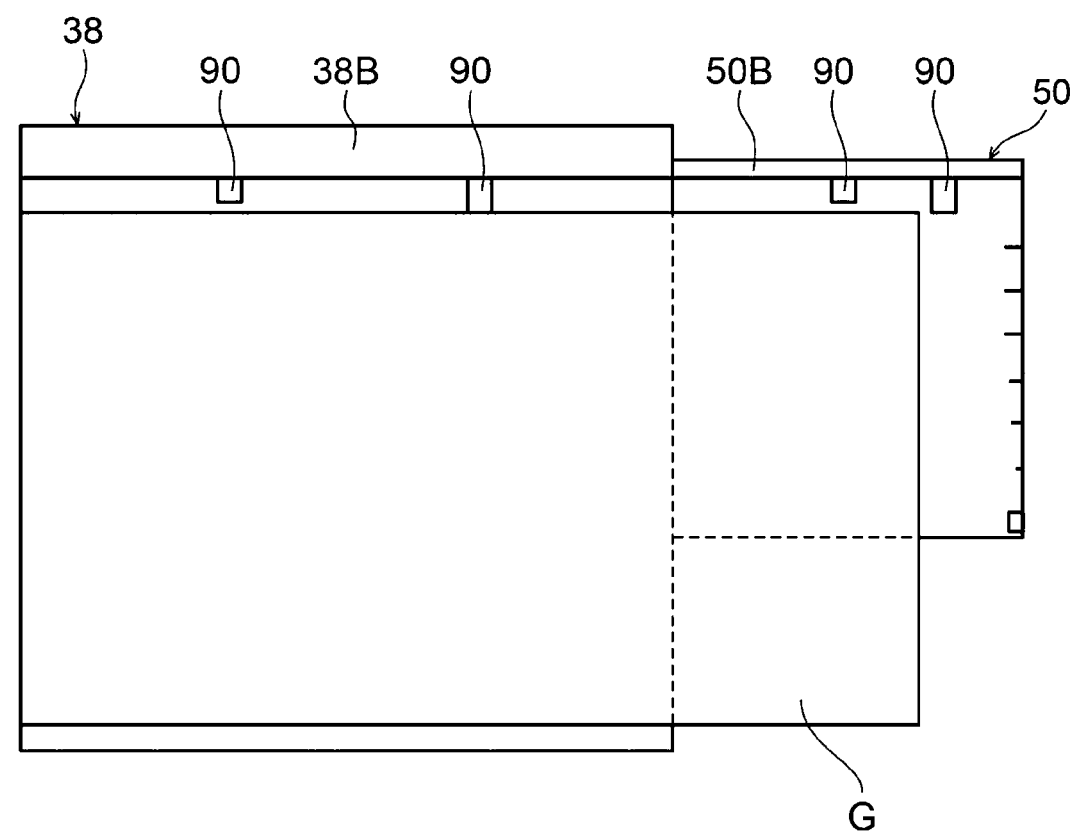
FIG. 17 is a plan view of the structure illustrated in FIG. 16 where the second enlargement portion is moved rightward.

As illustrated in FIG. 15, FIG. 16, and FIG. 17, multiple projections 90 to align the documents G may be disposed at the rear side wall 38B in the document receiving portion 38 and the side wall 50B in the second enlargement portion 50. Multiple (for example, two) projections 90 protrude frontward from each of the rear side wall 38B in the document receiving portion 38 and the side wall 50B in the second enlargement portion 50. In the present modification example, as illustrated in FIG. 15, regardless of when the documents G are accommodated in the document receiving portion 38 in misaligned positions (while the documents G are inclined), as illustrated in FIG. 16 and FIG. 17, the right wall 50E in the second enlargement portion 50 and the projections 90 correct the positions of the documents G to align the documents G by moving the second enlargement portion 50 in the lateral direction.

In the present exemplary embodiment, as illustrated in FIG. 2 and FIG. 3, the document receiving portion 38 is disposed below the document container portion 32 to at least partially overlap the document container portion 32 in a plan view, but this is not the only possible example. The document receiving portion 38 may be disposed over the document container portion 32 to at least partially overlap the document container portion 32 in a plan view.

In the present exemplary embodiment, as illustrated in FIG. 4 and FIG. 5, the space 501 between the second enlargement portion 50 (specifically, the mount wall 50A) and the first enlargement portion 40 is open at the device front side, but this is not the only possible example. For example, the space 501 between the second enlargement portion 50 and the first enlargement portion 40 may be closed at the device front side.

In the present exemplary embodiment, the second enlargement portion 50 moves obliquely upward to the right toward the first enlargement portion 40 in conjunction with the rightward movement of the first enlargement portion 40, but this is not the only possible example. For example, the second enlargement portion 50 may move horizontally and parallel to the first enlargement portion 40.

In the present exemplary embodiment, among the multiple ribs 50L disposed at the right wall 50E in the second enlargement portion 50, a subset of the ribs 50L disposed closer to the device front side has smaller dimensions in the lateral direction than a subset of the ribs 50L disposed closer to the apparatus rear side, but this is not the only possible example. For example, all the ribs 50L may have the same dimensions in the movement direction.

Modification Examples of Interlocking Mechanism 60

In the present exemplary embodiment, the coupling shaft 64 is disposed at the first enlargement portion 40, and the long hole 62 is formed at the second enlargement portion 50, but this is not the only possible example. For example, the coupling shaft 64 may be disposed at the second enlargement portion 50, and the long hole 62 may be formed at the first enlargement portion 40.

In the present exemplary embodiment, the long hole 62 guides the coupling shaft 64 in the direction in which the second enlargement portion 50 moves toward the first enlargement portion 40 in conjunction with the rightward movement of the first enlargement portion 40, but this is not the only possible example. For example, the long hole 62 may have only the function of being coupled with the coupling shaft 64.

In the present exemplary embodiment, while the second enlargement portion 50 is in the stationary state in the third section 62C after moving rightward in conjunction with the rightward movement of the first enlargement portion 40, the long hole 62 allows the first enlargement portion 40 to move further rightward, but this is not the only possible example. For example, while the second enlargement portion 50 is in the stationary state after moving rightward in conjunction with the rightward movement of the first enlargement portion 40, the long hole 62 may restrict the rightward movement of the first enlargement portion 40.

In the present exemplary embodiment, while the second enlargement portion 50 is in the stationary state after moving rightward in conjunction with the rightward movement of the first enlargement portion 40, the long hole 62 allows the coupling shaft 64 to move relative to the long hole 62 to the support position where the coupling shaft 64 supports the second enlargement portion 50 by moving the first enlargement portion 40 further rightward, but this is not the only possible example. For example, the long hole 62 may allow the coupling shaft 64 to move relative to the long hole 62 to the unsupported position where the second enlargement portion 50 is not supported by moving the first enlargement portion 40 further rightward while the second enlargement portion 50 is in the stationary state after moving rightward in conjunction with the rightward movement of the first enlargement portion 40.

Modification Examples of Ribs 38K and Ribs 50K

Figure 18:
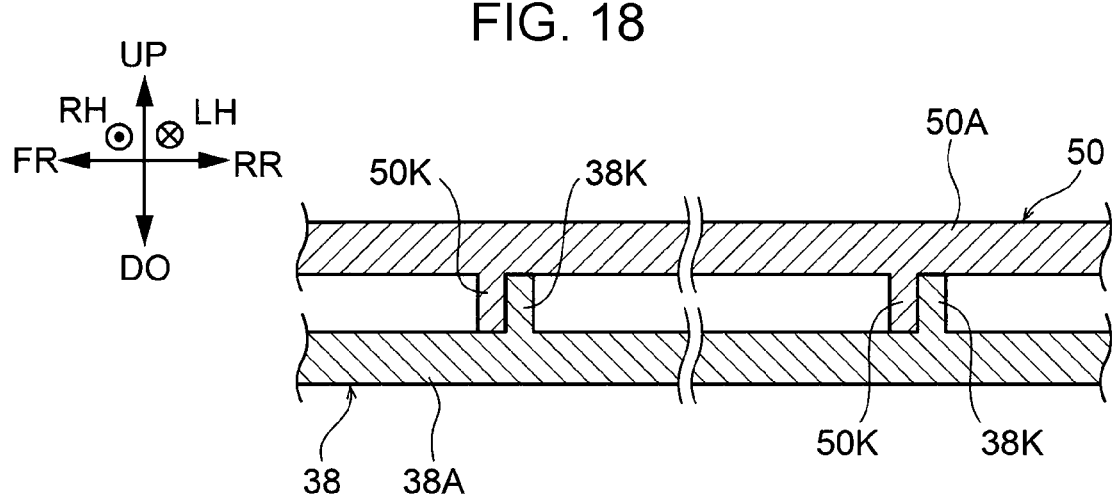
FIG. 18 is a cross-sectional view, viewed from a side, of a modification example obtained by modifying ribs that restrict movements of the second enlargement portion in the document reading device according to the present exemplary embodiment in a device front-rear direction.

In the present exemplary embodiment, each of the multiple ribs 38K is disposed adjacent to a corresponding one of the multiple ribs 50K in the second enlargement portion 50 at the front of the rib 50K, but this is not the only possible example. For example, as illustrated in FIG. 18, each of the multiple ribs 38K may be disposed adjacent to a corresponding one of the multiple ribs 50K at the rear of the rib 50K.

Figure 19:
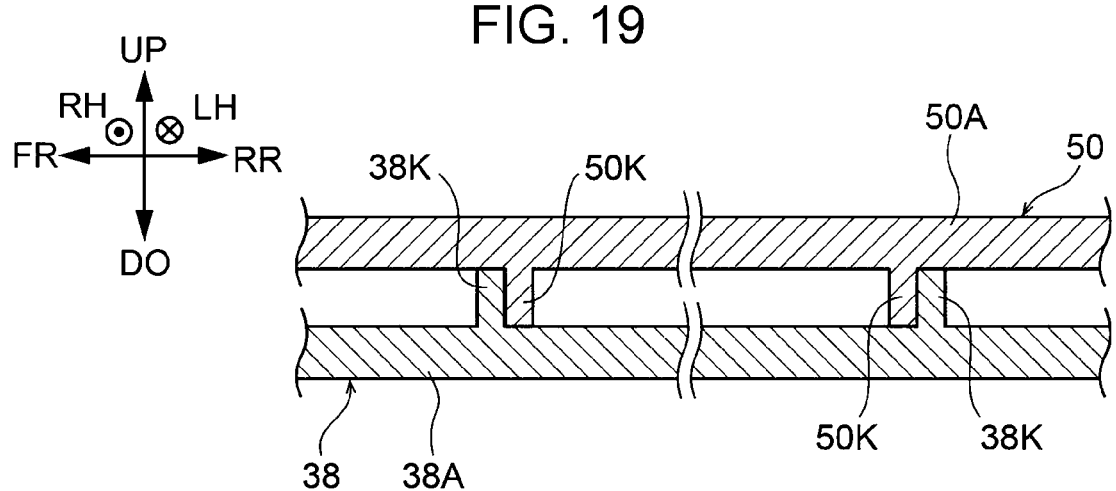
FIG. 19 is a cross-sectional view, viewed from a side, of a modification example obtained by modifying ribs that restrict movements of the second enlargement portion in the document reading device according to the present exemplary embodiment in the device front-rear direction.

As illustrated in FIG. 19, the multiple ribs 38K may include, in combination, the ribs disposed adjacent to the corresponding ribs 50K at the front of the ribs 50K and the ribs disposed adjacent to the corresponding ribs 50K at the rear of the ribs 50K. In this case, for example, the rib disposed adjacent to the corresponding rib 50K at the front of the rib 50K and the rib disposed adjacent to the corresponding rib 50K at the rear of the rib 50K may be alternately arranged.

Figure 20:
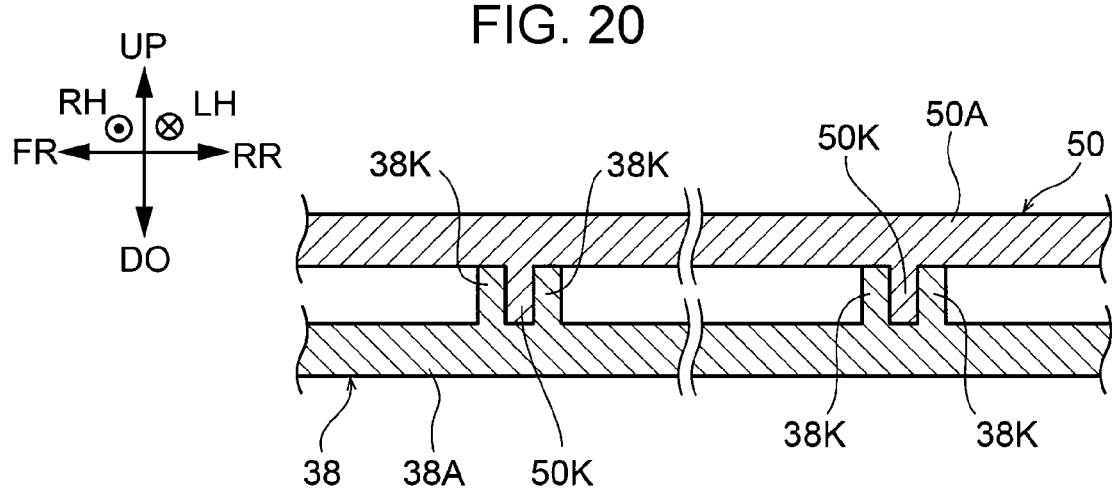
FIG. 20 is a cross-sectional view, viewed from a side, of a modification example obtained by modifying ribs that restrict movements of the second enlargement portion in the document reading device according to the present exemplary embodiment in the device front-rear direction.

As illustrated in FIG. 20, the ribs 38K and/or the ribs 50K may hold the other ribs in between in the front-rear direction. FIG. 20 illustrates a structure where the multiple ribs 38K hold a corresponding one of the ribs 50K in between in the front-rear direction.

In the present exemplary embodiment, the ribs 38K restrict the movement, in the device front-rear direction, of the second enlargement portion 50 that moves rightward in conjunction with the rightward movement of the first enlargement portion 40, but this is not the only possible example. For example, the present exemplary embodiment may eliminate the ribs 38K, and the second enlargement portion 50 that moves rightward in conjunction with the rightward movement of the first enlargement portion 40 may be freely movable in the device front-rear direction.

Modification Examples of Document Reading Device 30

In the present exemplary embodiment, the document reading device 30 is used as an example of the transport device, but this is not the only possible example. For example, the transport device may be, for example, an image forming apparatus that includes an image forming portion that forms images on recording media serving as transportable members transported along the transport path. Alternatively, the transport device may be, for example, a transport device that transports the transportable members for the purposes other than image reading or image formation, or that transports the transportable members for simply transporting the transportable members.

Modification Example of Document Reading Device Body 31

In the present exemplary embodiment, as illustrated in FIG. 1, the document reading device body 31 is fixed to the image forming apparatus body 11 above the image forming apparatus body 11, but this is not the only possible example. For example, the document reading device body 31 may be disposed above the image forming apparatus body 11 to open or close the image forming apparatus body 11.

Other Modification Examples

In the present exemplary embodiment, after the second enlargement portion 50 moves obliquely upward toward the first enlargement portion 40, the support portion 80 supports the device front side of the second enlargement portion 50, but this is not the only possible example. For example, after the second enlargement portion 50 moves obliquely upward toward the first enlargement portion 40, the second enlargement portion 50 may be supported at only the apparatus rear side.

The present disclosure is not limited to the above exemplary embodiments, and may be modified, changed, or improved in various manners within the gist not departing from the scope thereof. For example, two or more of the above modification examples may be combined as appropriate.

The foregoing description of the exemplary embodiments of the present disclosure has been provided for the purposes of illustration and description. It is not intended to be exhaustive or to limit the disclosure to the precise forms disclosed. Obviously, many modifications and variations will be apparent to practitioners skilled in the art. The embodiments were chosen and described in order to best explain the principles of the disclosure and its practical applications, thereby enabling others skilled in the art to understand the disclosure for various embodiments and with the various modifications as are suited to the particular use contemplated. It is intended that the scope of the disclosure be defined by the following claims and their equivalents.

APPENDIX (((1)))
A transport device, comprising:
  a container portion that accommodates a transportable member;
  a receiving portion disposed above or below the container portion to at least partially overlap the container portion in a plan view, to receive the transportable member;
  a transport path along which the transportable member accommodated in the container portion is transported to the receiving portion;
  a first enlargement portion disposed at the container portion, the first enlargement portion moving in a direction opposite to a transport direction in which the transportable member is transported from the container portion to the transport path to enlarge a container area in the container portion for receiving the transportable member; and
  a second enlargement portion disposed at the receiving portion, the second enlargement portion moving in the opposite direction in conjunction with a movement of the first enlargement portion in the opposite direction to enlarge a container area in the receiving portion for receiving the transportable member.

(((2)))
The transport device according to (((1))), wherein the receiving portion is disposed below the container portion to at least partially overlap the container portion in a plan view.

(((3)))
The transport device according to (((2))), wherein the second enlargement portion moves obliquely upward toward the first enlargement portion in conjunction with the movement of the first enlargement portion in the opposite direction.

(((4)))
The transport device according to (((3))), comprising:
  a to-be-coupled portion disposed at either one of the first enlargement portion and the second enlargement portion; and
  a coupling portion disposed at another one of the first enlargement portion and the second enlargement portion, and coupled with the to-be-coupled portion,
  wherein the to-be-coupled portion guides the coupling portion in a direction where the second enlargement portion moves toward the first enlargement portion in conjunction with the movement of the first enlargement portion in the opposite direction.

(((5)))
The transport device according to (((4))), wherein the to-be-coupled portion allows the first enlargement portion to move further in the opposite direction while the second enlargement portion is in a stationary state after moving in the opposite direction in conjunction with the movement of the first enlargement portion in the opposite direction.

(((6)))
The transport device according to (((5))), wherein the to-be-coupled portion moves the coupling portion relative to the to-be-coupled portion to a support position where the coupling portion supports the second enlargement portion as a result of the first enlargement portion being moved further in the opposite direction while the second enlargement portion is in a stationary state after moving in the opposite direction in conjunction with the movement of the first enlargement portion in the opposite direction.

(((7)))

The transport device according to any one of (((2))) to (((6))), wherein a space between the second enlargement portion and the first enlargement portion is open at a device front side.

(((8)))

The transport device according to (((7))), comprising: a support portion disposed at the first enlargement portion to support a device front side of the second enlargement portion after the second enlargement portion moves obliquely upward toward the first enlargement portion.

(((9)))

The transport device according to any one of (((1))) to (((8))), wherein the receiving portion includes a restrictor that restricts a movement, in a device front-rear direction, of the second enlargement portion that moves in the opposite direction in conjunction with the movement of the first enlargement portion in the opposite direction.

(((10)))

The transport device according to any one of (((1))) to (((9))),
  wherein a plurality of protrusions are disposed at an end of the second enlargement portion in a movement direction of the second enlargement portion to extend in the movement direction, and arranged side by side in a device front-rear direction, and
  wherein a subset of the plurality of protrusions disposed closer to a device front side has a smaller dimension in the movement direction than a subset of the plurality of protrusions disposed closer to a device rear side.

(((11)))

A document reading device serving as the transport device according to any one of (((1))) to (((10))), comprising:
  a reading portion that reads an image on a document serving as the transportable member transported along the transport path.

(((12)))

An image forming apparatus, comprising:
  the document reading device according to (((11))); and
  an image forming portion capable of forming an image read by the document reading device on a recording medium.

What is claimed is:

1. A transport device, comprising:
  a container portion that accommodates a transportable member;
  a receiving portion disposed above or below the container portion to at least partially overlap the container portion in a plan view, to receive the transportable member;
  a transport path along which the transportable member accommodated in the container portion is transported to the receiving portion;
  a first enlargement portion disposed at the container portion, the first enlargement portion moving in a direction opposite to a transport direction in which the transportable member is transported from the container portion to the transport path to enlarge a container area in the container portion for receiving the transportable member; and
  a second enlargement portion disposed at the receiving portion, the second enlargement portion moving in the opposite direction in conjunction with a movement of the first enlargement portion in the opposite direction to enlarge a container area in the receiving portion for receiving the transportable member.

2. The transport device according to claim 1, wherein the receiving portion is disposed below the container portion to at least partially overlap the container portion in a plan view.

3. The transport device according to claim 2, wherein the second enlargement portion moves obliquely upward toward the first enlargement portion in conjunction with the movement of the first enlargement portion in the opposite direction.

4. The transport device according to claim 3, comprising:
  a to-be-coupled portion disposed at either one of the first enlargement portion and the second enlargement portion; and
  a coupling portion disposed at another one of the first enlargement portion and the second enlargement portion, and coupled with the to-be-coupled portion,
  wherein the to-be-coupled portion guides the coupling portion in a direction where the second enlargement portion moves toward the first enlargement portion in conjunction with the movement of the first enlargement portion in the opposite direction.

5. The transport device according to claim 4, wherein the to-be-coupled portion allows the first enlargement portion to move further in the opposite direction while the second enlargement portion is in a stationary state after moving in the opposite direction in conjunction with the movement of the first enlargement portion in the opposite direction.

6. The transport device according to claim 5, wherein the to-be-coupled portion moves the coupling portion relative to the to-be-coupled portion to a support position where the coupling portion supports the second enlargement portion as a result of the first enlargement portion being moved further in the opposite direction while the second enlargement portion is in a stationary state after moving in the opposite direction in conjunction with the movement of the first enlargement portion in the opposite direction.

7. A document reading device serving as the transport device according to claim 6, comprising:
  a reading portion that reads an image on a document serving as the transportable member transported along the transport path.

8. A document reading device serving as the transport device according to claim 3, comprising:
  a reading portion that reads an image on a document serving as the transportable member transported along the transport path.

9. A document reading device serving as the transport device according to claim 4, comprising:
  a reading portion that reads an image on a document serving as the transportable member transported along the transport path.

10. A document reading device serving as the transport device according to claim 5, comprising:
  a reading portion that reads an image on a document serving as the transportable member transported along the transport path.

11. The transport device according to claim 2, wherein a space between the second enlargement portion and the first enlargement portion is open at a device front side.

12. The transport device according to claim 11, comprising:
  a support portion disposed at the first enlargement portion to support a device front side of the second enlargement portion after the second enlargement portion moves obliquely upward toward the first enlargement portion.

13. A document reading device serving as the transport device according to claim 11, comprising:
a reading portion that reads an image on a document serving as the transportable member transported along the transport path.

14. A document reading device serving as the transport device according to claim 12, comprising:
a reading portion that reads an image on a document serving as the transportable member transported along the transport path.

15. The transport device according to claim 1, wherein the receiving portion includes a restrictor that restricts a movement, in a device front-rear direction, of the second enlargement portion that moves in the opposite direction in conjunction with the movement of the first enlargement portion in the opposite direction.

16. A document reading device serving as the transport device according to claim 15, comprising:
a reading portion that reads an image on a document serving as the transportable member transported along the transport path.

17. The transport device according to claim 1,
wherein a plurality of protrusions are disposed at an end of the second enlargement portion in a movement direction of the second enlargement portion to extend in the movement direction, and arranged side by side in a device front-rear direction, and
wherein a subset of the plurality of protrusions disposed closer to a device front side has a smaller dimension in the movement direction than a subset of the plurality of protrusions disposed closer to a device rear side.

18. A document reading device serving as the transport device according to claim 1, comprising:
a reading portion that reads an image on a document serving as the transportable member transported along the transport path.

19. An image forming apparatus, comprising:
the document reading device according to claim 18; and
an image forming portion capable of forming an image read by the document reading device on a recording medium.

20. A document reading device serving as the transport device according to claim 2, comprising:
a reading portion that reads an image on a document serving as the transportable member transported along the transport path.

* * * * *